United States Patent
Cimadamore et al.

(10) Patent No.: US 10,275,226 B2
(45) Date of Patent: Apr. 30, 2019

(54) STRUCTURAL REPRESENTATION OF GENERIC TYPE VARIABLE IN A NOMINALLY TYPED VIRTUAL MACHINE

(71) Applicant: ORACLE INTERNATIONAL CORPORATION, Redwood Shores, CA (US)

(72) Inventors: Maurizio Cimadamore, Donabate (IE); Brian Goetz, Williston, VT (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 107 days.

(21) Appl. No.: 15/332,277

(22) Filed: Oct. 24, 2016

(65) Prior Publication Data
US 2017/0115965 A1   Apr. 27, 2017

Related U.S. Application Data

(60) Provisional application No. 62/245,739, filed on Oct. 23, 2015.

(51) Int. Cl.
*G06F 9/445* (2018.01)
*G06F 8/30* (2018.01)
(Continued)

(52) U.S. Cl.
CPC ............ *G06F 8/315* (2013.01); *G06F 9/4488* (2018.02); *G06F 9/44521* (2013.01);
(Continued)

(58) Field of Classification Search
CPC ... G06F 8/41; G06F 8/43; G06F 8/434; G06F 8/44; G06F 8/447; G06F 8/315;
(Continued)

(56) References Cited

U.S. PATENT DOCUMENTS 6,018,628 A * 1/2000 Stoutamire ............. G06F 8/437
717/118
9,891,900 B2 * 2/2018 Goetz ................... G06F 9/4488
(Continued)

OTHER PUBLICATIONS

Dragos et al "Compiling Generics Through User-Directed Type Specialization", 2009, Proceedings of the 4th workshop on the Implementation, Compilation, Optimization of Object-Oriented Languages and Programming Systems. (Year: 2009).*

(Continued)

*Primary Examiner* — Jason D Mitchell
(74) *Attorney, Agent, or Firm* — Hickman Palermo Becker Bingham LLP

(57) ABSTRACT

Techniques herein process type variables to transform type parameters (TPs) of generic classes. In an embodiment, a computer stores a generic class attribute associated with a definition of a generic class. The generic class attribute includes a type variable declaration (TVD) for each TP. Each TVD is associated with usage entries (VUEs) within the definition. Each VUE indicates an actual type for use, within a portion of the definition, as the TP represented by the VUE. Based on how a particular portion of the definition uses a particular TP represented by a particular TVD of a particular VUE, the computer determines whether the particular VUE is to be assigned to a particular type or erased. In response to determining that the particular VUE is to be erased, the computer configures the particular VUE to indicate erasure. Otherwise, the computer assigns the particular type to the particular VUE.

21 Claims, 12 Drawing Sheets

(51) Int. Cl.
*G06F 9/455* (2018.01)
*G06F 9/448* (2018.01)
*G06F 8/41* (2018.01)

(52) U.S. Cl.
CPC ........ *G06F 9/44557* (2013.01); *G06F 9/4552* (2013.01); *G06F 9/45504* (2013.01); *G06F 9/45558* (2013.01); *G06F 8/433* (2013.01); *G06F 2009/45562* (2013.01)

(58) Field of Classification Search
CPC ...... G06F 8/433; G06F 9/445; G06F 9/44521; G06F 9/4488; G06F 9/45504; G06F 9/4552
USPC .......................................................... 717/108
See application file for complete search history.

(56) References Cited

U.S. PATENT DOCUMENTS

| | | | | |
|---|---|---|---|---|
| 9,910,680 | B2* | 3/2018 | Goetz | .................. G06F 9/4498 |
| 2003/0115573 | A1 | 6/2003 | Syme | |
| 2005/0055682 | A1 | 3/2005 | Gadre | |
| 2006/0080644 | A1* | 4/2006 | Fuhrer | .................. G06F 9/4488 717/137 |
| 2006/0236315 | A1 | 10/2006 | Bracha | |
| 2008/0127070 | A1 | 5/2008 | Barcia | |
| 2008/0282238 | A1 | 11/2008 | Meijer | |
| 2012/0005660 | A1* | 1/2012 | Goetz | .................. G06F 8/437 717/140 |
| 2014/0019947 | A1* | 1/2014 | Goetz | .................. G06F 8/437 717/141 |
| 2014/0068557 | A1* | 3/2014 | Vanags | .................. G06F 8/437 717/116 |
| 2015/0301840 | A1* | 10/2015 | Goetz | .................. G06F 9/4488 717/166 |
| 2015/0331681 | A1* | 11/2015 | Rose | .................. G06F 8/437 717/143 |
| 2015/0363174 | A1* | 12/2015 | Rose | .................. G06F 8/31 717/114 |
| 2016/0011992 | A1* | 1/2016 | Sandoz | .................. G06F 3/0622 711/163 |
| 2016/0202961 | A1* | 7/2016 | Goetz | .................. G06F 9/449 717/148 |
| 2017/0039043 | A1* | 2/2017 | Haupt | .................. G06F 8/447 |
| 2017/0116007 | A1 | 4/2017 | Cimadamore | |
| 2017/0147302 | A1* | 5/2017 | Goetz | .................. G06F 8/437 |
| 2017/0364339 | A9* | 12/2017 | Goetz | .................. G06F 9/449 |
| 2018/0024844 | A1* | 1/2018 | Goetz | .................. G06F 9/4488 717/148 |

OTHER PUBLICATIONS

Kennedy et al. "Design and Implementation of Generics for the NET common Language Runtime", 2001, Proceedings of the ACM SIGPLAN 2001 conference on Programming language design and implementation. (Year: 2001).*

Cimadamore, U.S. Appl. No. 15/332,346, filed Oct. 24, 2016, Interview Summary, dated Jul. 19, 2018.

Venners et al., "Generics in C#, Java and C++", A Conversation with Andres Hejlsberg Part VII, dated Jan. 26, 2004, https://www.artima.com/intv/generics2.html, 4 pages.

Kennedy et al., "Design and Implementation of Generics for the .NET Common Language Runtime", dated May 2001, 12 pages.

Jonathan Pryor's web log, "Comparing Java and C# Generics", What Are Generics, dated Aug. 31, 2007, 16 pages, http://www.jprl.com/Blog/archive/development/2007/Aug-31.html.

Johannes Rudolph's Blog, "NET Generics Implementation" dated Apr. 21, 2010, https://jorudolph.wordpress.com/2010/04/21/net-generics-implementation/, 7 pages.

Cimadamore, U.S. Appl. No. 15/332,346, filed Oct. 24, 2016, Office Action, dated Apr. 12, 2018.

* cited by examiner

STRUCTURAL REPRESENTATION OF GENERIC TYPE VARIABLE IN A NOMINALLY TYPED VIRTUAL MACHINE

CROSS-REFERENCE TO RELATED APPLICATIONS; BENEFIT CLAIM

This application claims the benefit of Provisional Appln. 62/245,739, filed Oct. 23, 2015, the entire contents of which is hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE DISCLOSURE

This disclosure relates to execution of parameterized types on nominally-typed object-oriented virtual machines. Techniques of language-neutral parameterization and structural representation of generic type variables are presented.

BACKGROUND

A virtual machine, such as a Java virtual machine (JVM), may load, compile, and execute or interpret programmed behaviors of defined types, such as classes. The structure and behavior of a type may be defined in a representation, such as a class file, that has descriptive metadata and bytecode instructions.

In a nominally-typed virtual machine, the class file format may encode most type information as string literals. This is a convenient choice because some virtual machines, such as the Java virtual machine (JVM), implement a nominal type-system, where each class is identified by a name. However, string-literal encoding may be problematic when trying to represent richer type information, particularly for structural types such as tuple types, function types, or parameterized class types.

A generic class is a template from which different actual parameterized types may be instantiated by specifying particular combinations of type arguments. For example, a Java List type is a generic class that may be instantiated as a List of Strings, List of Numbers, and so forth. The following terminology may be used herein.

class List<X> { . . . } is a generic class declaration
    X in 'class List<X>' is a type-variable or type parameter
    List<String> is a parameterized type as obtained by instantiating a generic class
    String in List<String> is a type-argument
    These terms support the following additional semantics.
    one generic class can be instantiated into many parameterized types
    a parameterized type binds the type-variable array into a concrete type-arguments array Directly supporting constructs such as parameterized types in some virtual machines may generally be difficult and require that the virtual machine be aware of several language-level properties such as subtyping, type-substitution, and variance. Moreover, such properties may differ between different programming source languages.

Other virtual machines, such as the .NET VM, have properties that are often quite different from virtual machines that were initially developed to support statically typed languages, such as the JVM. For example, the .NET VM has mechanisms for handling parameterized types embedded directly within it. Primitive type arguments for generic types is another example of a feature often not implemented by virtual machines that support statically-typed languages. Furthermore, providing support for such new language features within existing virtual machines risks breaking migration compatibility by disrupting the design of the virtual machine execution environment. For example, implementing improvements to parameterized types in the Java language risks breaking backwards compatibility migration of legacy JVM systems by disrupting the design of the JVM execution environment.

DETAILED DESCRIPTION

Figure 1:
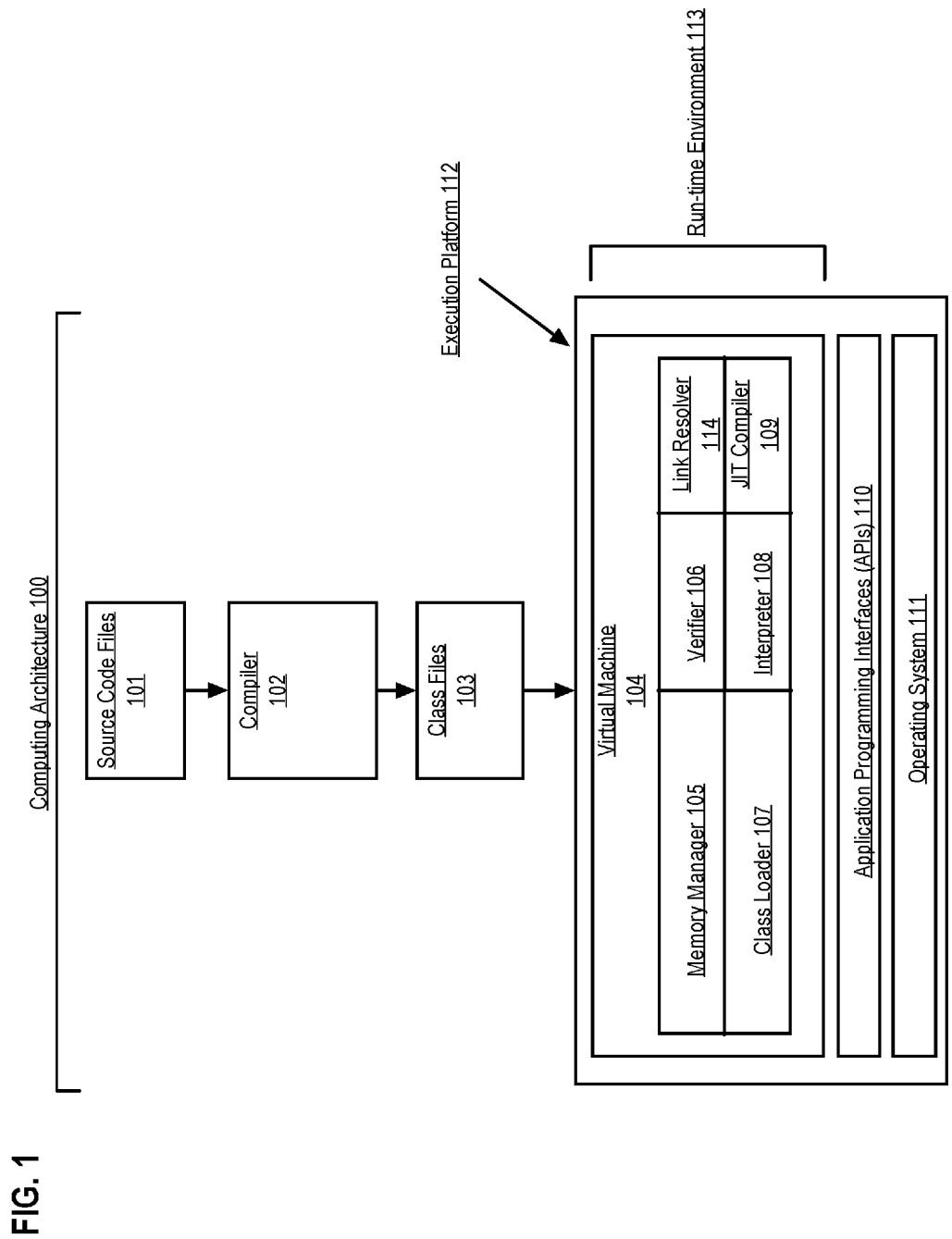
FIG. 1 is a block diagram that depicts an example architecture of a virtual machine, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
    1.0 General Overview
    2.0 Example Operating Architecture 2.1 Example Class File Structure
3.0 Computer Overview
   3.1 Generic Class And Metadata
   3.2 Generic Class Attribute
   3.3 Parameters of a Generic Class
   3.4 Generic Class Frame
   3.5 Type Variable Declaration
   3.6 Type Variable Usage Entry
   3.7 Usage Context
   3.8 Templated Instantiation
4.0 Metadata Attributes
   4.1 Generic Class Attribute
   4.2 Type Entries
   4.3 Arraytype_Info
   4.4 Methoddescriptor_Info
   4.5 Parameterizedtype_Info
   4.6 Typevar_Info
5.0 Type Variable Transformations
6.0 Example Process For Adjusting A Generic Class
7.0 Lexical Enclosure
8.0 Parameterized Types
   8.1 Composition Of Parameterized Types
9.0 Reduction
   9.1 Legacy Format
   9.2 Specialization Context
   9.3 Concrete Instantiation
   9.4 Metadata Literals
   9.5 Reuse For Templated Instantiation
10.0 Reducing A Single Use
11.0 Entirely Reducing A Constant Pool
12.0 Example Process For Reducing A Generic Class
13.0 Reduction By Parameterized Type
14.0 Populating The Specialization Context
   14.1 Incompatible Class Change
15.0 Example Process For Reduction By Parameterized Type
16.0 Reducing Other New Forms
   16.1 Other Example Reductions
17.0 Type Propagation
18.0 Compatibility
19.0 Hardware Overview

1.0 General Overview

Computerized techniques are provided for processing type variables to transform type arguments of generic classes. In an embodiment, parameter transformations include erasure and specialization. In an embodiment, generic classes are transformed into legacy classes. In an embodiment, primitive types and user-defined value types may be type arguments of generic classes. A value type may be an identity-less aggregation of data fields and, depending on the embodiment, may or may not be immutable.

As discussed above, generic classes are classes having placeholders for one or more types that are needed to fully implement the generic class. Actual types that substitute for the placeholders are provided by a use site within a client class which calls or depends upon the generic class. Thus, for example, a generic class List<X> may be defined which creates a list of objects of a type that has yet to be provided. A class which uses the generic List class above declares the type of the objects to be held in the List. In response to processing this declaration, an alternative virtual machine instantiates the List class for the declared type, such as List<String>. Whereas, a legacy Java virtual machine may instead instantiate the List class for Object. In a virtual machine environment, instantiating a class follows a procedure referred to as "loading, linking, and initializing," which may be enhanced to perform various transformations described herein upon generic classes that have various structural attributes described herein. For example, an arbitrary class may depend in some way upon a generic class and specify actual types with which to implement the generic class. Because a virtual machine may instantiate different implementations for different actual types, new forms of metadata may be used to efficiently expose and track details that may guide the automated transformation and implementation of generic classes. In other words class tooling, such as a class loader, may process novel metadata structures that may occur within a generic class definition to implement (fully define) the generic class.

During loading, the class file of the referenced class, which might be or not be a generic class, is located and storage is allocated within working memory in a region known as the "constant pool" of the virtual machine to hold the various structures of the referenced class, such as constants, class references, method references, and so forth. However, upon loading, references to other classes are initially symbolic. For example, the constant pool may store information that indicates the entry should contain a reference to a method of Class A which takes as input two integers and returns a Boolean. However, the entry may not yet store a concrete pointer to the location in memory where the code for that method is stored and is thus referred to as a symbolic link. During linking, the symbolic references are resolved to concrete pointers. In the example above, the virtual machine searches for a class file corresponding to Class A and then performs loading, linking, and initializing for Class A based on the located class file. Hence, the resolution of symbolic links may cause the loading, linking, and initializing procedure to be performed recursively provided the referenced class has not already been prepared in memory. The virtual machine maintains a cache or index where existing instantiations can be looked up, preventing duplicate constant pools from being instantiated. Once the referenced class has been loaded, the symbolic reference can be replaced with a concrete pointer to the location in memory where the class referenced by the symbolic link was loaded in memory. During initializing, the initialization method of the referenced class is executed to initialize the values of various variables and/or constants held by the referenced class.

However, when a generic class is referenced, the loading, linking, and initializing procedure is more nuanced. Unlike with non-generic classes, the virtual machine cannot rely solely upon the class file of the generic class to resolve the symbolic links. This is because the class file has placeholders for various types, referred to as type variables, for which the actual type needs to be supplied by the class which references the generic class. Otherwise, the target of symbolic links and, in the case of primitives, the size to reserve is unknown until the generic class is actually used. Thus, when a reference is made to a generic class, the class which references the generic class provides additional information that binds each of the type variables to a particular type. The virtual machine, now with the known types, can effectively create an instantiation of the generic class which "replaces" the type variables with the concrete types to which they are bound during loading and then resolve the symbolic links of the client (dependent) class. However, this also means is that every time a new permutation of types are assigned to type variables, the virtual machine must perform the loading, linking, and initializing procedure again. This creates a significant amount of overhead in terms of both processor resources (the process must be executed anew for each new permutation encountered) and memory footprint (each new permutation has its own constant pool). A portion of the start-up time can be mitigated by copying or cloning a "base" instantiation in memory and then making replacements where necessary, but this does not resolve the memory footprint issue.

As an optimization, rather than mapping each new permutation of types to a distinct constant pool, in many cases different types may share the same constant pool, such as with erasure. With erasure, a single, homogeneous parameterization of List<X> can work on any reference X. An erasure and an erased class may involve a single, homogeneous parameterization of List<X> that works on any X, provided that X is a reference. In Java every reference type is a subtype of Object, and erasure may replace all occurrences of X inside List<X> with Object. Erased and not erased occurrences of X are more or less semantically similar. However, there are important exceptions, such as exemplified by the following generic class and its subsequent use by a client class.

```
class Box<X> {
    X x;
}
```

The following is logic of a class that depends upon generic class Box.

```
Box<String> bs = new Box<String>( );
String s = bs.x;
```

The initializing of local variable 's' is interesting. If types are fully reified, and the VM generates an artifact for Box<String>, then this artifact will have a field 'x' of type String. For example, a source compiler may generate artifacts such as the following.

```
class Box$String {
    String x;
}
Box$String bs = new Box$String( );
String s = bs.x;
```

However if erasure is instead applied, then code generation is more complicated because the erased version of Box only has a field of type Object, as exemplified by the following artifacts.

```
class Box$erased {
    Object x;
}
Box$erased bs = new Box$erased( );
String s = bs.x; // Type mismatch error
```

Semantic analysis may reveal type errors, such as the above attempt to assign an Object where a String is expected. Because static analysis by the compiler reveals that the field access occurs on a Box<String>, such knowledge can be inserted back in the form of a downcast, such as exemplified by the following valid artifact.

```
Box$erased bs = new Box$erased( );
String s = (String)bs.x; //ok
```

Furthermore, there may be additional complications. For example, there are several ways in which a difference between reified and non-reified semantics may arise, such as exemplified by the following artifact.

if (obj instanceof Box<String>) { }

A reified language/VM may accommodate the above test (because Box<String> is translated into a separate artifact). However with erasure, then the above test may lose needed information and be unable to do little processing other than verify that 'obj' is a Box of some type. That is why Java rejects this kind of instance test.

Reflection is another complication. Reflection allows dynamic inspection of the contents of a class. Because classes are erased in Java, what reflection exposes are the erased declarations of fields methods. This means that it will be up to the user to adjust types based on available knowledge of the involved objects. On the other hand, were the types fully reified, reflection would be able to provide actual type information about the members of such parameterized classes.

Thus, the decision regarding whether or not a type variable may be safely erased is extremely complicated and depends heavily on the rules that a source language defines for erasure. In some embodiments, the virtual machine passes along the decision of whether or not to erase a type variable to the developer of the source language. Thus, the virtual machine assumes that the class files output by the source language compiler when referencing a parametric class specify, for each type variable, whether that type variable can be safely erased or whether an instantiation where the type variable is bound to a particular type needs to be generated. For example, the class file of the generic class may be augmented with an attribute that identifies the type variables defined within the generic class. Then, each use of that type variable is represented by records that identify the corresponding type variable and in this particular use case what the erasure should be when the type variable is specified as erased by the client class. This allows different uses of the same type variable to potentially be erased to different types based on the erasure rules of the source language.

As a result, when the generic class is referenced by a client class, the type passed in could either be a token symbolizing 'erased' or information identifying a particular type. If the 'erased' token is passed in for a particular type variable, each use of the type variable is "replaced" during instantiation by the erasure type defined by the record corresponding to that use. The following artifact exemplifies a generic class.

```
class Box<<X> {
    void m(X x, Box<X> bx) { }
}
```

A JVM may generate class Box<erased> during class loading to satisfy a dependency on Box. For example, the JVM could try replacing X with the erasure of X, such as Object, as follows.

```
class Box$erased {
    void m(Object x, Box<Object> bx) { }
}
```

However, a potential problem is that the second parameter of the method is Box<Object> and not Box<erased>. As such, the compiler may further replace X with 'erased' as follows.

```
class Box$erased {
    void m(erased x, Box<erased> bx) { }
}
```

This has improved the situation for the second parameter, but the first parameter has worsened. In other words, not all occurrences of X should be treated in the same way when applying erasure. In support of a more flexible approach to erasure, the classfile representation for type-variables in the generic classfile is ideal. Such a representation may be as follows.

```
class Box<<X> {
    void m(X/Object x, Box<X/erased> bx) { }
}
```

Here the notation X/T means that T is the erased type that should be used if X is bound to an erased type. As such, Box<erased> may be computed in two steps:
1. X/Object is translated to Object (since X is erased in Box<erased>)
2. X/erased is translated as 'erased' (since again X is erased in Box<erased>)

This produces the following class.

```
class Box$erased {
    void m(Object x, Box<erased> bx) { }
}
```

These steps works well for erased reference types, and are readily adapted for reified primitives. For example, the following is a computation of Box<int>.
1. X/Object is translated to int (since X is reified in Box<int>)
2. X/erased is translated to int (since again X is reified in Box<int>)

This produces the following.

```
class Box$int {
    void m(int x, Box<int> bx) { }
}
```

Furthermore, applying the above transformations does not involve recursion. Rather, it is a straightforward substitution process. The results of this process may lead to new parameterizations which have not been seen before. However, these parameterizations may be resolved lazily, only when the method/field of the specialized class is being accessed during a later stage.

For example, in the event that a use within the generic class is erased to another 'erased' token, such as may occur if the parametric class references another parametric class, the process is repeated, although not necessarily immediately, for that other parameterized class. If a specific type is passed in for the particular type variable, each use of the type variable is "replaced" during instantiation with the specific type. In any case, if an instantiation of the constant pool exists that applies to the permutation of types passed in, the already existing constant pool for that permutation can be referenced to resolve symbolic links, without performing loading, linking, and initialization for that permutation repeatedly.

In an embodiment, a computer receives metadata of a generic class. The metadata defines type variables for the generic class. A given type variable is defined by a name. Furthermore, a type variable may contain a bounds, which may influence the variable's erasure computation and validity checking for a type assignment to the variable.

The computer receives an instruction from a client class that references a parameterization of the generic class. Data referenced by the instruction specifies whether the given type variable is to be erased or instantiated to a particular type. In other words, the client class references a set of argument types, which are either concrete types, or the special token "erased".

In response to determining that the data referenced by the instruction specifies that the given type variable is to be erased, the computer instantiates the generic class using the erasure type for the given type variable. Whereas, in response to determining that the data referenced by the instruction specifies that the given type variable is to be instantiated to the particular type, the computer instantiates the generic class using instead the particular type for the given type variable.

The instruction from the client class may specify types for none, some, or all of the type variables. For example, the instruction may specify binding one type variable to a particular type and erasing another type variable of the generic class. The instruction may omit a type binding for some or all type variables, which may be interpreted as implicitly specifying erasure of the unbound variables.

2.0 Example Operating Architecture

FIG. 1 illustrates an example computing architecture 100 in which techniques described herein may be practiced.

As illustrated in FIG. 1, a computing architecture 100 includes source code files 101 which are compiled by a compiler 102 into class files 103 representing the program to be executed. The class files 103 are then loaded and executed by an execution platform 112, which includes a run-time environment 113, an operating system 111, and one or more application programming interfaces (APIs) 110 that enable communication between the run-time environment 113 and the operating system 111. The run-time environment 113 includes a virtual machine 104 comprising various components, such as a memory manager 105 (which may include a garbage collector), a verifier 106 to check the validity of class files 103 and method instructions, a class loader 107 to locate and build in-memory representations of classes, an interpreter 108 for executing the virtual machine 104 code, a just-in-time (JIT) compiler 109 for producing optimized machine-level code, and a link resolver 114 for resolving symbolic references to classes and/or methods.

In an embodiment, the computing architecture 100 includes source code files 101 that contain code written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpass a threshold (is "hot"), the virtual machine 104 invokes the JIT compiler 109 to perform an analysis of the block and generate optimized machine-level instructions which replaces the "hot" block of code for future executions. Since programs tend to spend most of their time executing a small portion of their overall code, compiling just the "hot" portions of the program can provide similar performance to fully compiled code, but without the start-up penalty.

In order to provide clear examples, the source code files 101 have been illustrated as the "top level" representation of the program to be executed by the execution platform 111. However, although the computing architecture 100 depicts the source code files 101 as a "top level" program representation, in other embodiments the source code files 101 may be an intermediate representation received via a "higher level" compiler that processed code files in a different language into the language of the source code files 101. In order to illustrate clear examples, the following disclosure assumes that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, Chapter 4 of the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion will assume that each of the class files 103 represents a respective "class" defined in the source code files 101 (or dynamically generated by the compiler 102 or virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
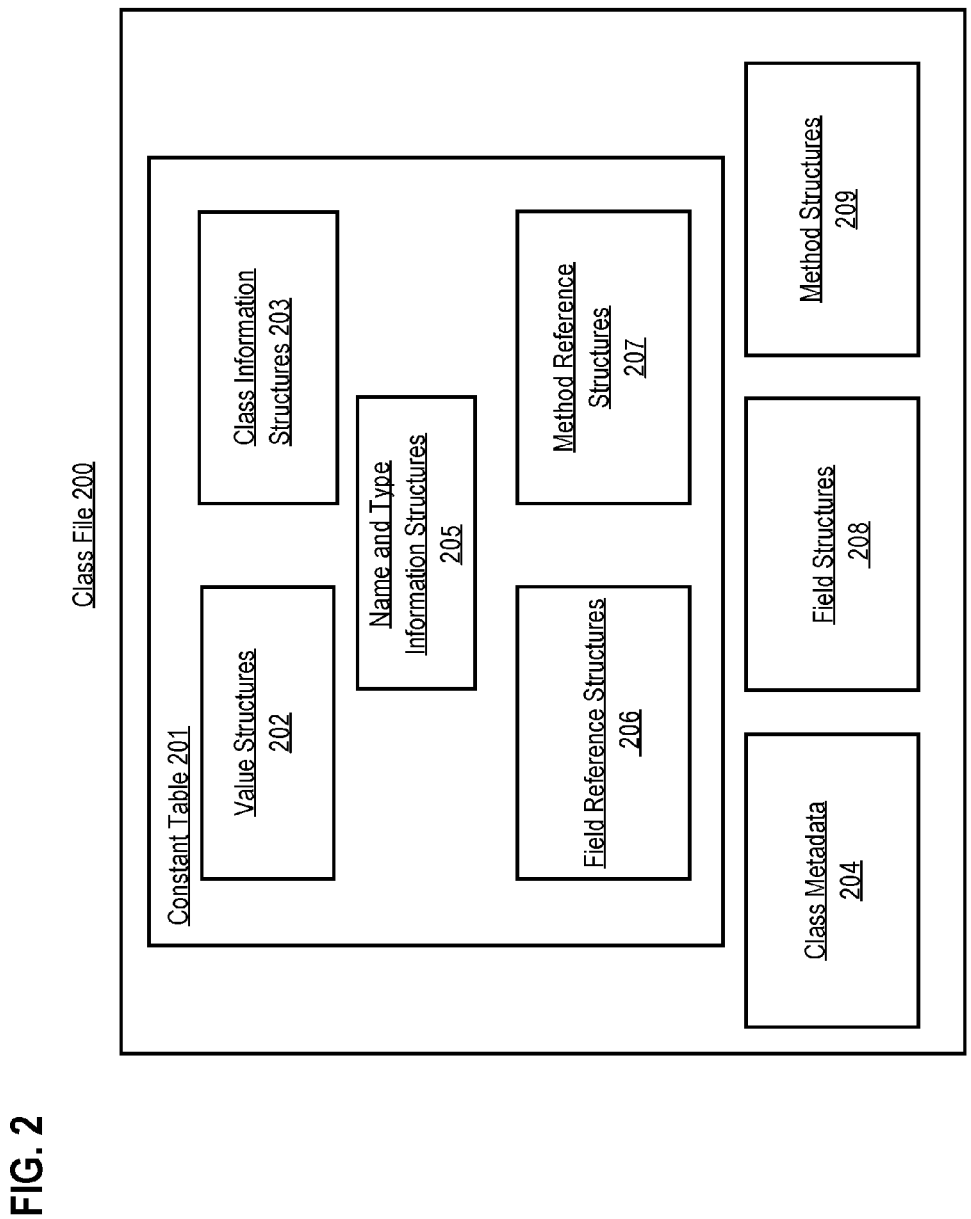
FIG. 2 is a block diagram that depicts an example type definition format for a virtual machine, in an embodiment.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 204, and method structures 209.

In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202

(representing constant values of type int, long, double, float, byte, string, and so forth), class information structures 203, name and type information structures 205, field reference structures 206, and method reference structures 207 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 206 of the constant table 201 hold an index into the constant table 201 to one of the class information structures 203 representing the class defining the field and an index into the constant table 201 to one of the name and type information structures 205 that provides the name and descriptor of the field. Method reference structures 207 of the constant table 201 hold an index into the constant table 201 to one of the class information structures 203 representing the class defining the method and an index into the constant table 201 to one of the name and type information structures 205 that provides the name and descriptor for the method. The class information structures 203 hold an index into the constant table 201 to one of the value structures 202 holding the name of the associated class. The name and type information structures 205 hold an index into the constant table 201 to one of the value structures 202 storing the name of the field/method and an index into the constant table 201 to one of the value structures 202 storing the descriptor.

In an embodiment, class metadata 204 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { ... }" matches the descriptor "(I D L Thread) L Object".

In an embodiment, the virtual machine instructions held in the method structures 209 include operations which reference entries of the constant table 201.

Using Java as an example, consider the following class

```
class A
{
    int add12and13( ) {
        return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the run-time environment 113. As will be described in Section 2.3, eventually the run-time representation of the symbolic references are resolved into actual memory addresses by the virtual machine 104 after the referenced classes (and associated structures) have been loaded into the run-time environment and allocated concrete memory locations.

3.0 Computer Overview

Figure 3:
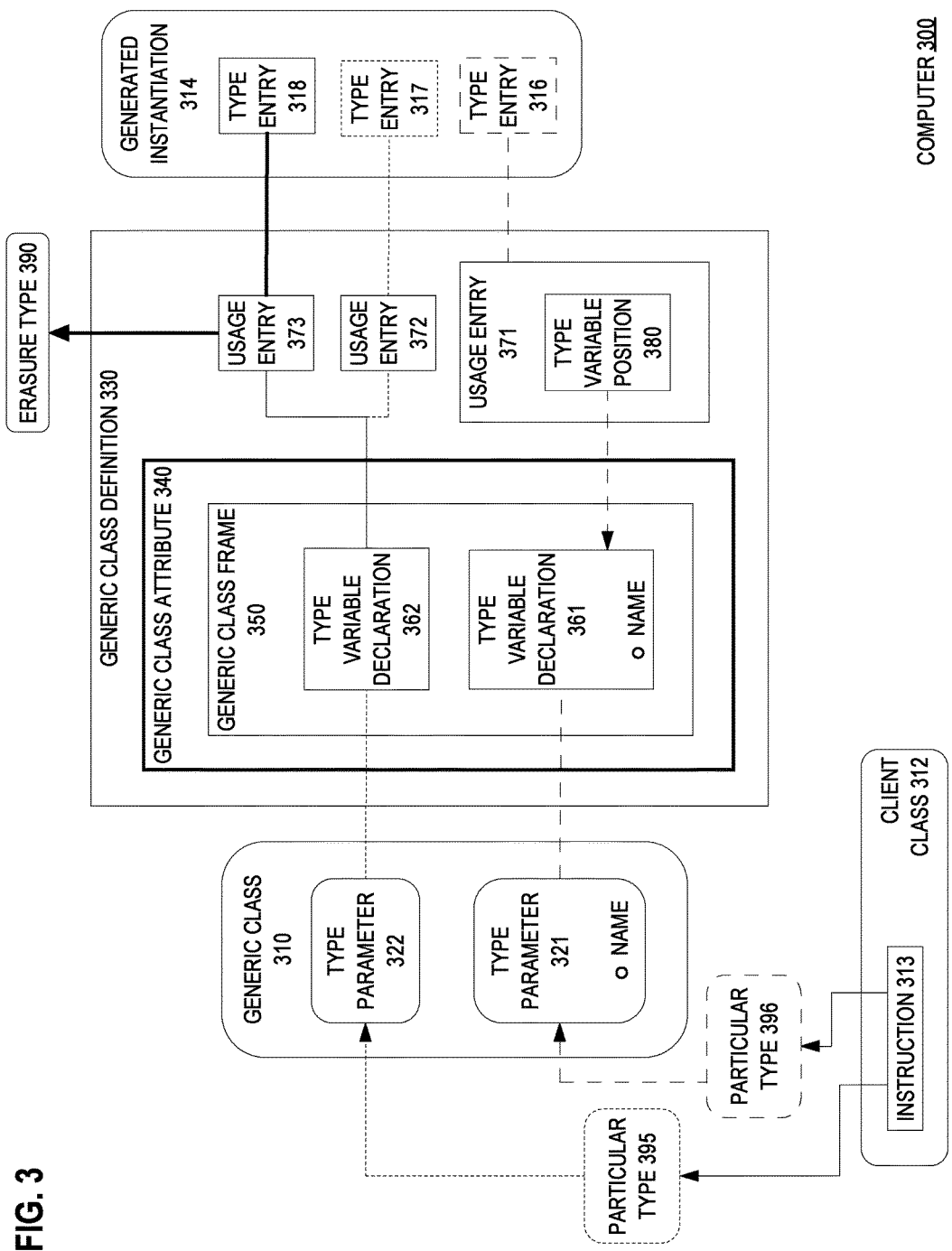
FIG. 3 is a block diagram that depicts an example computer that processes a structural representation of a generic type variable, in an embodiment.

FIG. 3 is a block diagram that depicts an example computer 300, in an embodiment. Computer 300 processes a structural representation of a generic type variable from within metadata of a type. Computer 300 may be a rack server computer such as a blade, a personal computer, a smartphone, or any computer that is capable of executing or manipulating a machine representation of an object-oriented type, such as a Java class file.

3.1 Generic Class and Metadata

Computer 300 includes software that generates or loads generic class definition 330 into memory of computer 300. Generic class definition 330 may be a machine-readable representation that defines generic class 310, such as a Java generic class.

Generic class definition 330 may contain byte-coded subroutines and metadata that describes dependencies and structural details of generic class 310. For example, generic class definition 330 may be a Java class definition as obtained from a class file or from a programming or metaprogramming tool that generates a class, such as a Java source compiler. For example, a Java compiler may have generated generic class definition 330 and emitted the results into a new class file. In operation, a runtime virtual machine, such as a JVM, or a class file tool may load generic class definition 330 into memory for manipulation.

3.2 Generic Class Attribute

Generic class definition 330 may contain structured metadata, such as a constant pool. Within the structured metadata may be metadata attributes, such as constant pool entries of a Java class file.

The metadata attributes are data structures that describe the details of generic class 310 and its dependencies on other classes. Amongst those metadata attributes in an embodiment is generic class attribute 340. Generic class attribute 340 may specify type parameterization details of generic class definition 330.

3.3 Parameters of a Generic Class

Generic class 310 has at least one placeholder dependency on another class. This dependency is a type parameter, such as 321-322. For example, the HashMap<Key,Value> class of Java is a generic class that has two parameters: Key and Value. Type parameters, such as Key and Value, are not actual types. They are formal types, which are merely notational placeholders that designate a need for actual types.

Type parameter 321 may have a type constraint (not shown), such as an upper or lower bound. For example, List<X extends Comparable> has an upper bound of Comparable.

Which actual types are involved as arguments when using generic class definition 330 to instantiate generic class 310 depends on the context in which generic class 310 is used. For example, generic class 310 may be the Java HashMap class. In one context, a HashMap may map from Strings to Shorts. Whereas in another context, a HashMap may map from Shorts to Strings.

Furthermore generic class 310 and generic class definition 330 may be intended for reuse in unknown contexts. For example, generic class definition 330 may have been compiled long before any production usage contexts arise.

3.4 Generic Class Frame

Different classes may contribute these parameterization details to generic class definition 330 and/or generic class attribute 340. For example, classes defined within the same compilation unit as generic class 310 may be used within generic class 310 and may contribute parameterization details to generic class definition 330.

For example, generic class 310 may be an inner class, and an outer class (not shown) may also be a generic class with its own type parameters. For example, these type parameters of the outer class may be used within generic class 310 due to static lexical scoping of the Java source language.

3.5 Type Variable Declaration

Java accommodates genericity through thorough and eager erasure of type parameters during compilation of generic class 310. As such, compilation of Java source code may generate generic class definition 330 without any information of actual argument types needed to instantiate generic class 310.

Whereas, generic class attribute 340 contains a binding structure for each type parameter 321-322. Each of type parameters 321-322 may have a corresponding type variable declaration, such as 361-362, within generic class attribute 340.

For example, type parameter 321 is associated with type variable declaration 361. This association may be based on type parameter 321 and type variable declaration 361 sharing a same offset within separate lists or sharing a same name that is unique within the type parameters of generic class frame 350. The information within type variable declaration 361 may include details such as the name of the corresponding type parameter. For example, List<X> has a type parameter name of X.

Inclusion of a type parameter name enables a disassembler such as javap to display genericity details from generic class attribute 340 in a human readable format. In an embodiment, each usage of type parameter 321 within class 310 is verified to detect the use of an actual type that is incompatible with type parameter 321. Such incompatibility should cause, for example, a compile error.

Although not shown, an upper or lower boundary type of type parameter 321 can be declared within type variable declaration 361 and used to verify the compatibility of a given actual type with type parameter 321. For example, generic class 310 may be List<X extends Number>, which could only be specialized or erased to Number or a type which inherits from Number.

In the shown embodiment, generic class attribute 340 contains generic class frame 350 that contains type variable declarations 361-362. In an embodiment, either or both of generic class attribute 340 and generic class frame 350 are absent.

3.6 Type Variable Usage Entry

Type parameter 321 may be utilized repeatedly, such as method parameters and return types. These uses may occur from elsewhere (not shown) in generic class definition 330, such as from other metadata.

Likewise, type variable declaration 361 may be repeatedly referenced from within generic class definition 330.

Additionally within generic class attribute 340, may be usage entries, such as 371-373, also referred to herein as CONSTANT_TypeVar_info.

Each of usage entries 371-373 is a metadata attribute that records a binding of a type argument to the type variable. A type argument may be an actual type or the erasure token. Because type parameter 322 may have alternate type bindings or erasures that are contextual, type variable declaration 362 may have multiple usage entries, such as 372-373.

In an embodiment, a source language compiler emits generic class definition 330, including usage entries 371-373 and generic class attribute 340 and its contents.

3.7 Usage Context

Dependent class 312 may be any class that references (uses or otherwise expressly depends upon) generic class 310. Although not shown as such, classes 310 and 312 may be the same class, such as when a class implementation is self-referential, such as when a setter or getter method of a class accesses one of the class's own fields.

In operation, a runtime virtual machine, such as a JVM, or a class file tool may process client class 312, such as during class loading. Dependent class 312 has a dependency on generic class 310 that sooner or later may cause class loading of generic class 310, which involves loading generic class definition 330 into memory if not already resident.

However, generic class 310 is not ready to be instantiated until type parameters 321-322 are bound to actual types, which client class 312 may specify. Furthermore, different portions of client class 312 may specify different actual types for the same type parameter(s), depending on how each portion uses generic class 310.

For example, a portion of client class 312 may need type parameter 322 to be bound (assigned) to a particular type or erased, depending on the nature of the dependency between that portion of client class 312 and generic class 310. The dependency may be encoded as instruction 313, which may be any declaration or reference of a member or instance of generic class 310. Instruction 313 may or may not include one or more executable bytecode instructions, such as invokevirtual for the JVM.

As shown in this example, instruction 313 specifies to computer 300, such as during class loading, that type parameter 321 should be bound to particular type 396. For example earlier during source compilation of client class 312, a Java compiler may have analyzed portion 314 to determine whether binding to particular type 396 or erasure is appropriate and generated instruction 313 accordingly.

3.8 Templated Instantiation

Computer 300 loads instruction 313 to determine what type bindings should be applied to type parameters 321-322. Computer 300 may need different instantiations of generic class 310 for different usage contexts (instructions) from client class 312 or other classes that depend upon generic class 310.

For each distinct (different combination of actual types bound to type parameters 321-322) instantiation, computer 300 may clone and/or adjust some or all of generic class definition 330. For example, generic class definition 330 may be a reusable (but not directly instantiable) template from which particular instantiations of generic class 310 may be created as adjusted clones of generic class definition 330, such as generated instantiation 314.

Computer 300 generates generated instantiation 314 to satisfy a dependency of instruction 313. Generated instance 314 is a concrete class that can be loaded and linked. Within generated instantiation 314 are type entries 316-318 that respectively correspond to usage entries 371-373.

Type entries 316-318 identify actual types that are used within generated instantiation 314. Computer 300 may create type entries 316-318 as follows.

For each usage entry 371-373, computer 300 identifies the corresponding particular type 395-396 that instruction 313 designates. For example as shown, particular type 396 corresponds to type entry 316, which are both drawn with dashed lines to illustrate their correspondence. Likewise, particular type 395 corresponds to type entry 317, both shown with dotted lines. As such, computer 300 initializes type entries 316-317 with respective particular types 395-396.

However, instruction 313 does not provide a particular type for type entry 318 or otherwise indicates that type entry 318 should be erased. This causes computer 300 to initialize type entry 318 with the erasure type of corresponding usage entry 373, which is erasure type 390.

Thus, computer 300 initializes all of type entries 316-318 with actual types. As such, generated instantiation 314 is a concrete instantiation of generic class 310. Unlike generic class 310, generated instantiation 314 can be fully loaded and linked by a class loader.

Other instructions from client classes that specify other particular types for type parameters 321-322. For these other instructions, computer 300 may clone additional generated instantiations from generic class definition 330. In this way, computer 300 may rapidly and repeatedly instantiate generic class 310 on demand.

In an embodiment, clones may be partial (missing parts) to save memory or defer processing. For example, computer 300 may clone generic class attribute 340, but not all of generic class definition 330. For example, method bodies need not be cloned.

A clone that is missing part of generic class definition 330 may still define a concrete instantiation of generic class 310, so long as the clone is accompanied by generic class definition 330 to supply missing parts as later needed.

4.0 Metadata Attributes

The following data structures may structurally represent definitions or dependencies for type genericity and type parameters. These data structures may be encoded as attributes within metadata that defines a generic class. Some of these attributes may be part of metadata of a type that merely depends on a generic class.

These attributes may be stored within the constant pool of a Java class file. Cross references between these attributes may be implemented by containment or by aggregation based on unique identifiers such as string literals or positional indices.

These attributes may occupy the memory of a class tool such as a class loader or be serialized over a network or into a class file.

4.1 Generic Class Attribute

A generic class attribute, such as 340, may occupy a constant pool of a class file for a generic class having one or more type parameters.

The GenericClass attribute acts as both a declaration that a class is ready for erasure or specialization and as an index of type usages that occur in the class file. A generic class may be lexically enclosed within an outer class. In such a case, the inner and outer class files may both have a GenericClass attribute, although not the same one. The following is an example GenericClass attribute that is defined as a nesting of substructures and fields:

```
GenericClass {
    u2 name_index; // of generic class
    u4 length; // Size of GenericClass in bytes
    u1 classCount;
    struct {
        u2 clazz; // Enclosing class
        u1 tvarCount;
        struct {
            u2 name; // Parameter name X, List<X>
            u2 bound; // Boundary type
        } tvars[tvarCount]; // Type variables
    } classes[classCount]; // Lexical enclosure
}
```

Each element of the tvars array is a type variable declaration, such as 361-362. Fields of type u2 may be two-byte unsigned shorts that may store an index value of a position within a constant pool. In other words, u2 may be a reference to a metadata item such as text or a descriptor structure, such as a method descriptor. Although the embodiment of GenericClass shown above specifies unsigned integers of particular widths, other embodiments may use other widths or other primitive types to encode these fields.

While the class file uses numeric indices, the GenericClass attribute contains nominal (text) information describing the owner and name of the type variable, so class file tools such as javap can present a human-readable view. The classes array field of GenericClass has an entry for the current class and an entry for each lexically enclosing class that is generic.

4.2 Type Entries

A family of constant pool entries called type entries may be any of the following:

An 8-bit unicode transformation format (UTF-8) representing a type descriptor, such as "I" or "LFoo;";

A UTF-8 representing the special single-character type descriptor "_", which is interpreted as "erased";

One of the following new constant pool forms ArrayType, ParameterizedType, or TypeVar, discussed below.

Various constant pool entities may contain references to other constant pool entries which can be any kind of type entry. For example, a reference may be contained within a field descriptor, an operand of a bytecode instruction, and the new constant pool forms themselves.

4.3 Arraytype_Info

To represent the signature for array of some type, a legacy Java compiler prepends the [ character to the type identifier for the component type. However if a type does not have a nominal (legacy) descriptor, such as for List<int>, this technique does not work. Instead a constant type may describe "array of something":

```
CONSTANT_ArrayType_info {
    u1 tag;
    u1 arrayDepth;    // Dimension
    u2 componentType; // Element type
}
```

A generic array is specified when componentType refers to a ParameterizedType, which is discussed below.

4.4 Methoddescriptor_Info

The following is a structural representation of a method signature:

```
CONSTANT_MethodDescriptor_info {
    u1 tag;
    u1 argCount;
    u2 returnType;
    u2[argCount] args;    // Arguments
}
```

A generic signature is specified when returnType or any of args refers to a ParameterizedType, which is discussed below.

A method signature may or may not have a nominal descriptor. If the signature has a nominal descriptor, then the signature may be encoded as either a UTF-8 or a MethodDescriptor constant.

Using structural method descriptors, instead of nominal ones, may reduce the size of a constant pool (and its class file) if there is redundancy across multiple method signatures.

4.5 Parameterizedtype_Info

The following is a structural representation of a usage (e.g. instantiation) of a generic type. The generic type may be defined in a different class file but referenced by the current class file, which need not itself represent a generic class:

```
CONSTANT_ParameterizedType_info {
    u1 tag;
    u2 enclosing;         // ParameterizedType
    u2 templateClassName; // Fully qualified
    u1 count;
    u2 params[count];     // Arguments for parameters
}
```

The above structure represents a usage (e.g. instantiation) of a generic type, per its field templateClassName, which may have the constant pool offset of the CONSTANT_Class_info attribute for the generic type. Each element of the params array represents an argument to bind to a type parameter of the generic type. Such an element may store a constant pool offset of a metadata attribute that provides a class or other type. If the type parameter is already assigned to an actual type, then the params element may identify a CONSTANT_Class_info of a concrete type. If the type parameter is not yet assigned or assigned but pending further processing (reduction, specified later herein), then the parms element may identify a TYPEVAR_INFO, such as usage entries 371-373.

The "enclosing" field is used when a class is nested within another parameterized class, such as an inner class within an outer class, and provides type parameter bindings from the enclosing context. In this case, the ParameterizedType constant describes the type variable bindings for the template class being described, and references another ParameterizedType for describing the enclosing context. Otherwise, for a class with no enclosing generic class, this reference may be null or an invalid constant pool slot value, such as zero. ParameterizedType is explained further below.

4.6 Typevar_Info

The following is a structural representation of a usage entry, such as 371-373:

```
CONSTANT_TypeVar_info {
    u1 tag;
    u1 tvarNumber; // index into flattened variables
    u2 ifErased;   // Optional erasure type
}
```

A usage entry may be erased to a particular base type as referenced by the "ifErased" field. The value of the ifErased field may be the special type token that is reserved to represent erasure if this usage entry should not be erased to a particular type. For example when ifErased is the special type token, then the usage entry may be generally erased using the same erasure as the use context.

Otherwise ifErased may be a reference to a particular erasure type, such as 390, to represent a precomputed erasure for a given use site. By setting ifErased to a particular erasure type, a compiler of an exotic language may precompute an erasure that departs from traditional or default erasure that computer 300 would otherwise expect. For example, an exotic language may have more complex erasure rules than occur in Java or than are described herein.

The GenericClass attribute is discussed above. However because of the ordering of type variable declarations 361- 362 within the GenericClass, type variable declaration 361 may conveniently be referenced by its position within generic class attribute 340. Positional numbering of type variable declarations is discussed later herein.

Even though a class file may use these numeric indices, the GenericClass attribute also contains the nominal information describing the owner and name of the type variable, so class tools such as a disassembler like javap can present a human-readable view. Furthermore, a descriptor of a type or method can be visualized as a tree, whose leaves are nominal types or type variables, and whose intermediate nodes ParameterizedType, ArrayType, and MethodDescriptor.

Furthermore, multiple usage entries may refer to a same parameter. For example, two type variables may represent alternate arguments for a same parameter used in two different contexts, with two different IfErased fields to specify which erasure to perform in that context. For example, usage entries 372-373 both correspond to type parameter 322.

Usage entry 372 may be assigned to particular type 395. Whereas, usage entry 373 may have its IfErased field designate erasure type 390. Such flexibility for selective erasure is beyond the capability of conventional class tooling.

As such, usage entries 372-373 may have a same position value for their type variable position, although not the same value as type variable position 380 that corresponds to a different type parameter.

5.0 Type Variable Transformations

Erasure heuristics may be complicated, depending on the semantics of the source language. Even Java erasure may be somewhat complicated by itself and further complicated by JVM diversity (legacy and non-legacy JVMs).

Furthermore if a JVM is enhanced to allow a primitive type to be a generic type argument, there is additional complexity. For example, Map<String, int> has two type arguments.

However, the String parameter may be handled according to an erasure scheme. Whereas, erasure of a primitive type, such as int, is not directly supported by a legacy JVM and may need additional semantics such as autoboxing. As such, String can be erased, but int should instead be specialized to avoid the time and space overheads of boxing. However, in other virtual machines, ints may be erased to a more generic type, such as a 32-bit type which may be shared with other primitive types. Thus, which types can and cannot be erased to a more generic type is wholly depending on the implementation of the virtual machine.

The encoding of type variable usages and accompanying precomputed erasure allows a source compiler to record the results of applying an arbitrarily complex erasure scheme. Erasure may be encoded to maintain compatibility with existing erased generics and shield the JVM from having to compute erasure.

This requires introduction of a special type token that is reserved to represent erasure of a parameter. This does not imply the introduction of erasure into the JVM type system. By the time the new constant pool forms are resolved, they will have been scrubbed of erasure tokens.

To prevent the JVM from having to compute erasure for each use of a type variable, the TypeVar constant contains, in addition to the index of the type variable being used, a type entry that describes the erasure to be used if that type variable has been erased. This is because not all uses of a type variable in a given class are identically treated.

Depending on the context in which a type variable appears, it may be preferred to merely indicate that erasure has been or will be applied by other logic. Another usage of the same parameter may need immediate erasure to a particular type that is specified by the type variable.

Rather than exposing the JVM to this complexity, the static compiler determines which cases are which, accordingly generates type variables, and lets the JVM perform mechanical substitutions. For example the following compilation unit has parameter T that gets different erasure processing depending on which usage of T:

```
class Bar<V> { } // LINE 1
class Foo<T extends Comparable, U> // LINE 2
    extends Bar<T> { // LINE 3
    T aT; // LINE 4
    Foo<T,U> aFoo; // LINE 5
}
```

For instantiation of Foo<Integer, int>, the first parameter is erased, and its erasure is to Comparable. However on line 3, erasure of T should not propagate into parameter V of Bar on line 1.

This would result in erasure of Bar with V=Comparable as the particular type of erasure. Instead, the supertype of Foo should be Bar<erased>, to propagate the erased token here, not replace it.

Field aFoo is similarly handled on line 5. Possible erasures for aFoo may be Foo<erased, int> or Foo<Comparable, int>. The former is compatible with legacy erased generics and also results in less total code footprint because the code for Foo<String, int> and Foo<List, int> may share an implementation. Likewise, a fully reified generic system may or may not choose Foo<Comparable, int>.

On the other hand on line 4, a concrete type is needed. Here Comparable is needed.

Accordingly, the TypeVar constant carries with it an alternate type to use in the event the associated type variable is erased. Assuming that "_" designates the erasure token, the metadata for Foo may include the following:

```
GenericClass[T, U]
class Foo extends ParamType[Bar, TypeVar[T, "_"]] {
    TypeVar[T, "Ljava/lang/Comparable;"] aT;
    ParamType[Foo, TypeVar[T, "_"], TypeVar[U,
```

```
    "_"]] aFoo;
}
```

At runtime, resolution of a TypeVar constant may be a mechanical process. The class loader may look up the type variable in the specialization context. For example if the context specifies particular type 395, such as Comparable, then the class loader uses particular type 395 for type parameter 322.

Such specialization need not be done during class loading. Specialization can be done ahead of time by a static build tool or deferred until later. The techniques herein work at a variety of specialization times: compile time, link time, class load time, or just-in-time.

In a more involved example, a type variable binding depends on other type variables, such as the following:

```
class Foo<X, Y extends Bar<X>> {
    void m(X x, Y y) { }
}
```

For this, a source compiler may generate the following:

```
class Foo {
    void m(TypeVar[X, "Ljava/lang/Object;"] x,
           TypeVar[Y, ParamType[Bar, TypeVar[X,
    "_"]] y) { }
}
```

In another example, erasure heuristics may shape the bytecode of a method invocation, as for line 5 of the following compilation unit:

```
class Foo<X> { void m(X x) { } }
class Bar<Y extends Bound> {
    Foo<Y> foo = ...
    Y y = ...
    foo.m(y) // LINE 5
}
```

On line 5, actual typing for invocation of foo.m(y) may depend on erasure heuristics. An invokevirtual bytecode instruction refers to both a receiver type and a descriptor.

If Y is erased, the descriptor should specify List::m (Object). Otherwise, the descriptor should specify List<Y>:: m(Y).

Note that the erasure treatment of Y in the method descriptor should describe the erasure of X in Foo, not the erasure of Y in Bar. This is because the method being described is a member of Foo.

The method invocation may be represented with the following:

```
invokevirtual owner=ParamType[Foo, TypeVar[Y, "_"]]
    desc=m(TypeVar[Y,
        "Ljava/lang/Object;"])
```

6.0 Example Process for Instantiating a Generic Class

Figure 4:
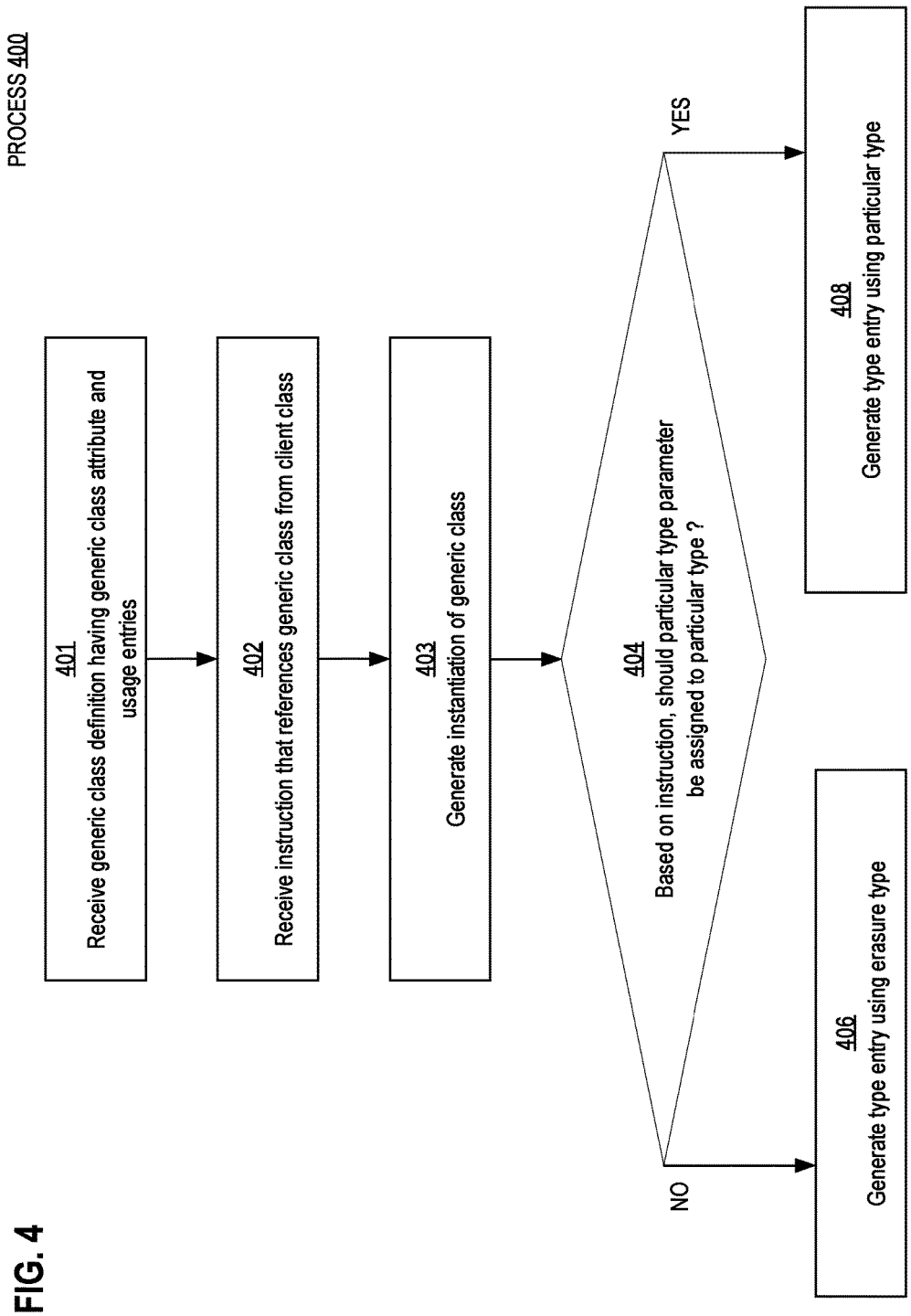
FIG. 4 is a flow diagram that depicts an example process for adjusting a usage entry of a generic class, in an embodiment.

FIG. 4 is a flow diagram that depicts an example process 400 for adjusting a usage entry of a generic class, in an embodiment. Process 400 is described in the context of FIG. 3.

Steps 401-402 may occur in the order shown, reversed, or more or less simultaneously. In step 401, a generic class definition having a generic class attribute and associated usage entries are received. In an embodiment, computer 300 may host a class tool or a JVM that receives generic class definition 330 in a binary format such as bytecode.

Computer 300 receives generic class definition 330 that encodes generic class 310 within memory or a file. Based on the presence of generic class attribute 340 or upon inspection of generic class 310 or generic class definition 330, computer 300 detects that class 310 is generic.

In step 402, an instruction is received that references the generic class from a client class. For example, computer 300 receives instruction 313 that references generic class 310 from client class 312 while class loading client class 312.

In step 403, an instantiation of the generic class is generated or modified. For example, computer 300 generates or adjusts generated instantiation 314.

In step 404, whether a particular type parameter should be assigned to particular type or erased is specified by the instruction. For example, instruction 313 may specify to computer 300 an erasure or a particular type for each of type parameters 321-322. Computer 300 may responsively generate usage entries 371-372, or select them for adjustment if they already exist within generic class definition 330.

For example based on instruction 313, computer 300 selects type parameter 321 for processing by erasure or other binding. Computer 300 selects usage entry 371 because it corresponds to type parameter 321.

Which type becomes bound to usage entry 371 may be determined by steps 404, 406, and 408. This depends on instruction 313, which at the time it was configured depended on how portion 314 uses type parameter 321, such as referenced by fields and bytecoded methods of client class definition 312.

Steps 406 and 408 are mutually exclusive ways of binding types to parameters of generic class 310.

Step 406 occurs when computer 300 determines that the particular type parameter should be erased, as indicated by instruction 313. For example, computer 300 generates type entry 318 and initializes it to refer to erasure type 390.

For example, computer 300 assigns a special token that indicated erasure, such as "_", to usage entry 373. Later, such as by a different tool or process or by a different phase of a current tool, a concrete type may replace type entry 318 to complete the erasure, such as with a root Object class during reduction.

Step 408 occurs when computer 300 determines that the particular type parameter should be assigned to a particular type. In step 408, the particular type is assigned to the corresponding type entry. For example, computer 300 assigns particular type 395 (as specified by instruction 313) to type entry 317.

7.0 Lexical Enclosure

Figure 5:
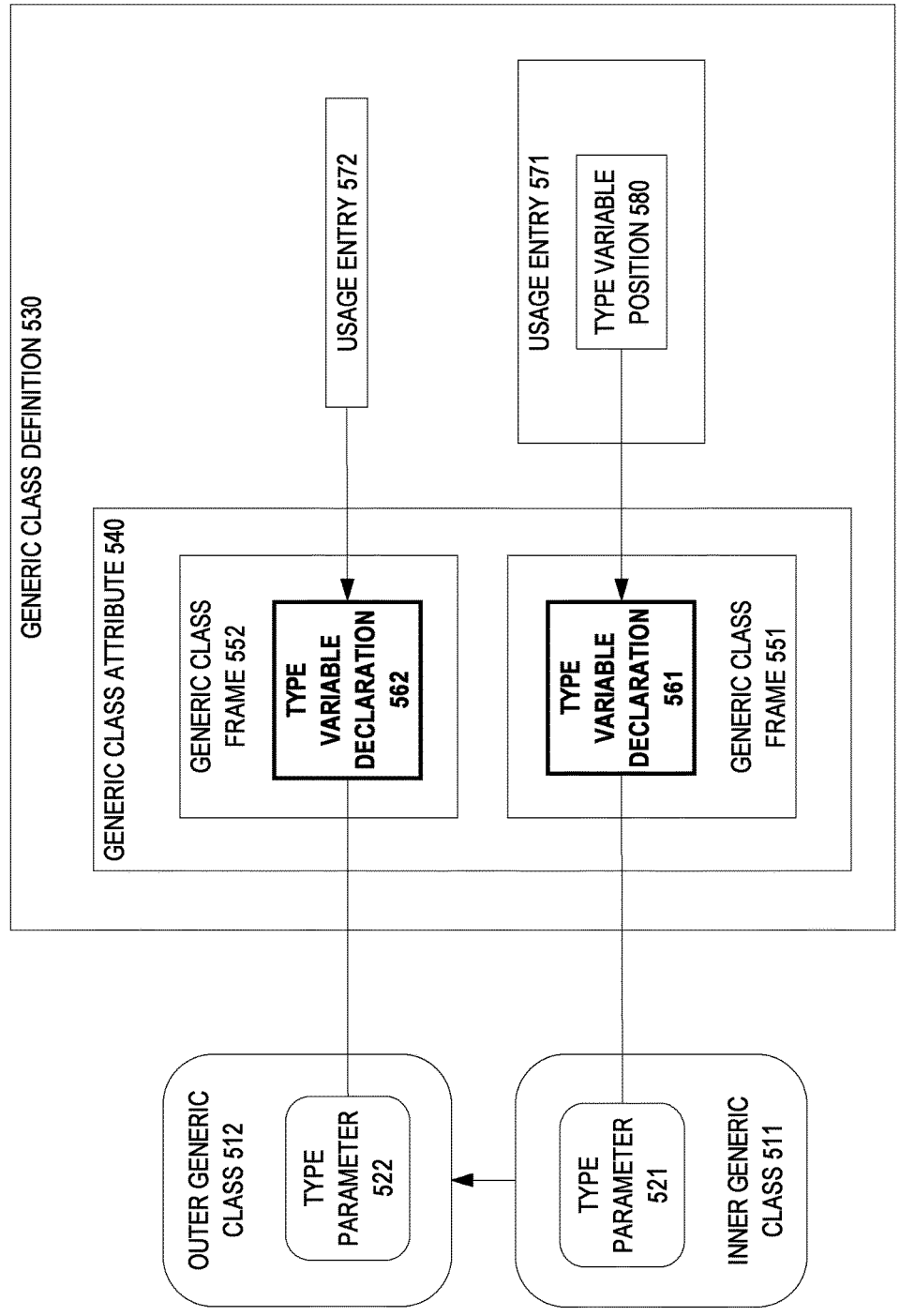
FIG. 5 is a block diagram that depicts an example Java source compiler that processes type variables based on a lexical nesting hierarchy of generic classes, in an embodiment.

FIG. 5 is a block diagram that depicts an example class loader 500, in an embodiment such as part of a runtime JVM. Class loader 500 processes type variables based on a lexical nesting hierarchy of generic classes. Class loader 500 may be part of an implementation of computer 300.

As a preface to this example, a Java source compiler may receive Java source for classes 511-512 within a single compilation unit, such as a Java source file, which the Java source compiler compiles, such as into class files. For example, the Java source compiler may emit a separate class file for each of classes 511-512.

For example, the Java source compiler may generate generic class definition 530 as a compiled (binary) representation of inner generic class 511. Inner generic class 511 is a lexically nested inner class of outer generic class 512.

Although not shown, outer generic class 512 may itself be an inner class that is nested within another outer generic class. Such nesting may be arbitrarily deep.

Both of classes 511-512 are generic classes with potentially more type parameters than shown. Although generic class definition 530 fully defines only inner generic class 511, generic class definition 530 also contains metadata that describes outer generic class 512.

Generic class definition 530 contains generic class attribute 540, which has separate generic class frames for each of classes 511-512. Generic class frames 551-552 encapsulate genericity metadata for respective classes 511-512.

Each of generic class frames 551-552 may contain multiple type variable declarations, such as 561-562. Although type variable declarations 561-562 occupy separate generic class frames 551-552, all of the type variable declarations within generic class attribute 540 together have a combined logical ordering.

For example, type variable declarations 561-562 may logically be regarded as occupying a single imaginary array, with type variable declaration 562 occupying a first position (offset 1) within the array, and type variable declaration 561 occupying a second position (offset 2) within the array. As such, usage entries 571-572 may refer to type variable declarations 561-562 according to such an offset, rather than by explicit naming.

For example, type variable position 580 may have a value of 2, which indicates the second type variable declaration within generic class attribute 540, which is type variable declaration 561. Likewise, usage entry 572 may have a type variable position with a value of 1 to refer to type variable declaration 562.

The Java source compiler emits class files, including a class file that contains generic class definition 530. Later, class loader 500 may load that class file and use type variable position 580 to detect that usage entry 571 refers to type variable declaration 561.

8.0 Parameterized Types

Figure 6:
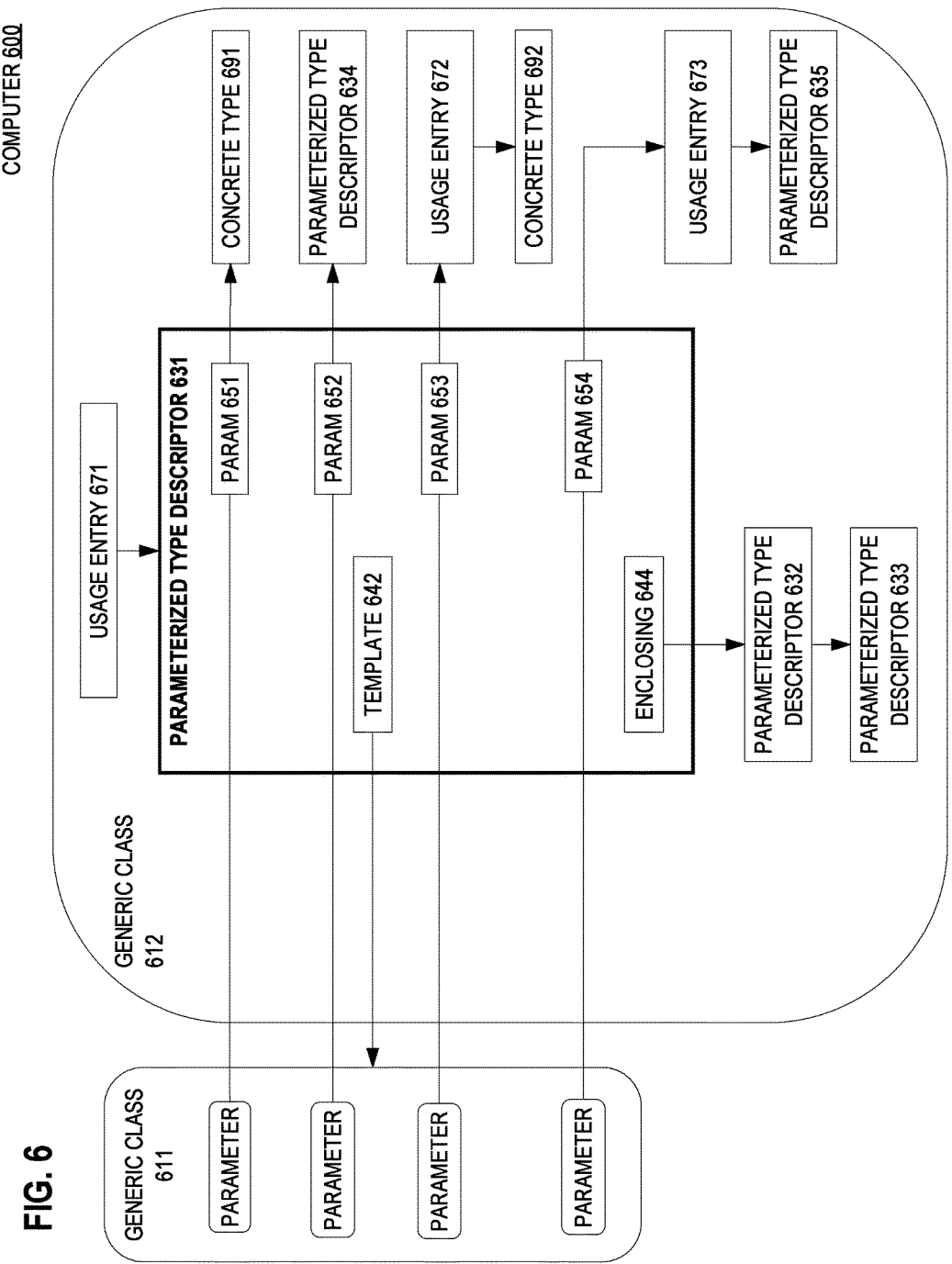
FIG. 6 is a block diagram that depicts an example computer that constructs, adjusts, or analyzes a graph of parameterized types and type usages, in an embodiment.

FIG. 6 is a block diagram that depicts an example computer 600, in an embodiment. Computer 600 constructs, adjusts, or analyzes a graph of parameterized types and type usages. Computer 600 may be an implementation of computer 300.

In this example, computer 600 may generate or receive a definition of generic class 612, such as a Java class, that uses generic class 611. As such the metadata (constant pool) of generic class 612 may have or need usage entries that refer to (are assigned to) generic class 611.

Although generic classes 611-612 are separate classes in this example, in other examples they may be the same class. That is, generic class 612 may have internal references to itself.

In operation, computer 600 may have a class loader that loads generic class 612 and selects usage entry 671 for processing. Generic class 612 depends on generic class 611. Usage entry 671 describes a particular instantiation of generic class 611 based on usage and actual arguments provided by generic class 612. Parameterized type descriptor 631 captures bindings for type parameters of generic class 611.

The ParmeterizedType constant discussed earlier and shown here as parameterized type descriptors 631-635 may individually represent any type that achieves polymorphism by parameterization, such as a Java generic class. One generic class may depend on another generic class in basic ways that cause parameterized type descriptors 631-635 to form some kinds of logical graphs based on associations as follows.

Parameterized type descriptors 631-635 exist within the metadata (constant pool) of a generic or other class, such as 612. Generic class 612 uses (depends on) generic class 611. This dependency is captured by a field within parameterized type descriptor 631 that identifies generic class 611, shown as template 642. Generic class 611 has type parameters that must be bound to actual types before either of classes 611-612 may be instantiated.

Each type parameter of generic class 611 corresponds to a respective type parameter of parameterized type descriptor 631, such as params 651-654. Each of params 651-654 should be bound to (refer to) a type.

The simplest binding assigns a concrete (actual and instantiable) type to a parameter. For example, param 651 is bound to concrete type 691.

Although not shown, generic class 611 may be an inner class and lexically enclosed within a generic outer class. By setting the "enclosing" field of parameterized type descriptor 631, shown as enclosing 644, inner and outer parameterized type descriptors may be connected. This enables daisy chaining parameterized type descriptors into a logical list when there is an underlying lexical relation, such as nesting. For example, parameterized type descriptor 631 may represent an inner class of generic classes that represented by parameterized type descriptors 632-633.

8.1 Composition of Parameterized Types

Parameterized type descriptors may be arranged as a logical tree. For example in Java, Map<List<Byte>, List<Short>> may be represented as a tree of parameterized type descriptors.

For example, param 652 is bound to parameterized type descriptor 634, which itself may have parameters and bindings of various kinds.

A parameter of parameterized type descriptor 631 may bind to a usage entry. For example Subclass<A,B,C, D>extends List<C>, in which case, generic class 611 may be List, generic class 612 may be Subclass, and param 653 may be C.

In the shown example, params 653-654 may bind to respective usage entries 672-673. Usage entries 672-673 may bind to concrete types, such as 692, or to other generic types, such as with parameterized type descriptor 635.

9.0 Reduction

Figure 7:
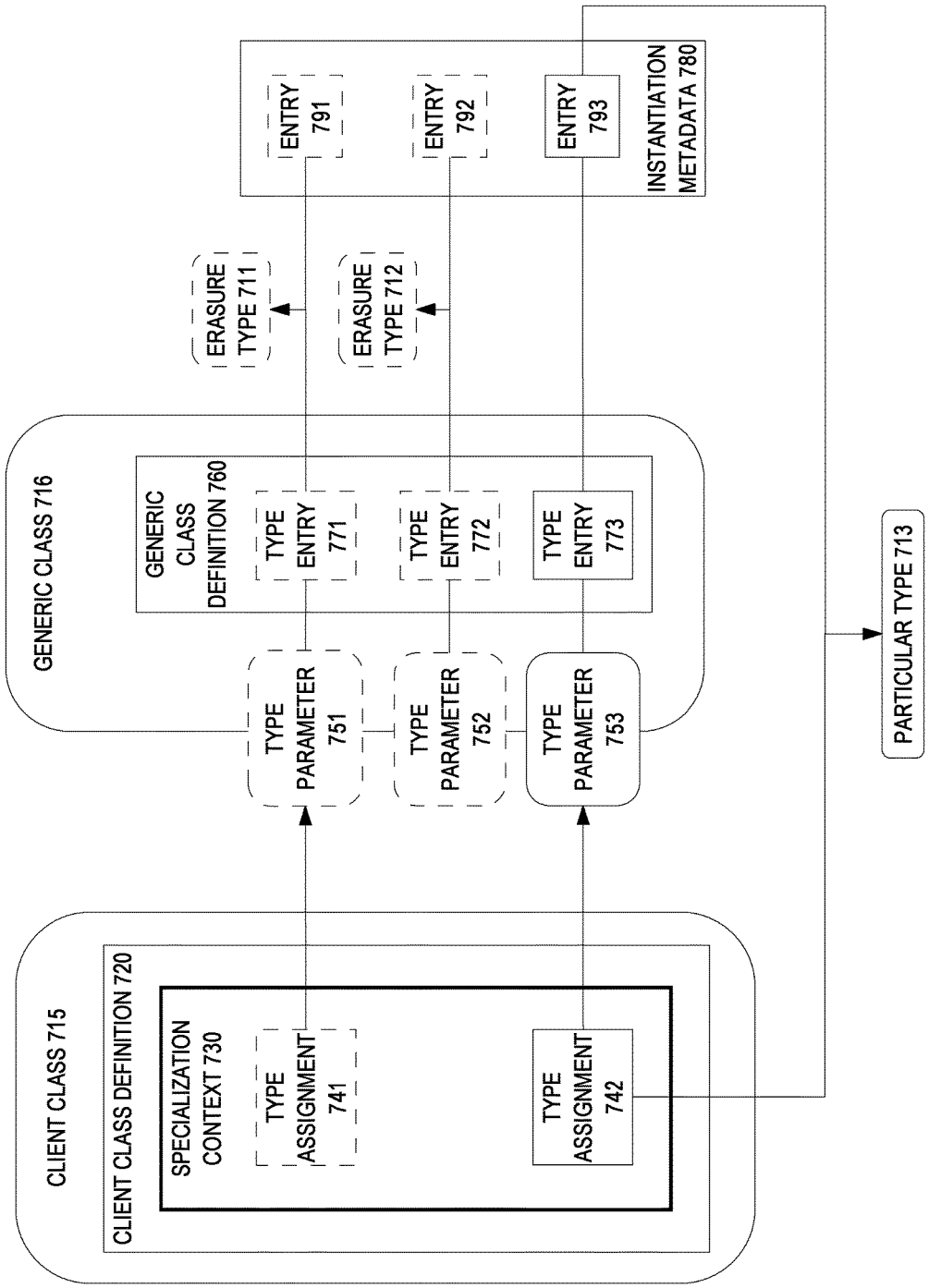
FIG. 7 is a block diagram that depicts an example computer that processes type assignments for parameters of a generic class to generate a concrete class, in an embodiment.

FIG. 7 is a block diagram that depicts an example computer 700, in an embodiment. Computer 700 processes type assignments for parameters of a generic class to generate a concrete class. Such processing may be known as reduction.

9.1 Legacy Format

For example, computer 700 may generate a concrete class from a generic class based on type parameter information provided within definitions of the generic class and on type-argument information provided by a client class that depends on the generic class. For example, the definition of the generic class may contain genericity metadata structures that are incompatible with a legacy class format. Computer 700 may generate a concrete class that instantiates the generic class and that conforms to the legacy class format.

For example, a legacy class format may expect nominal identifiers instead of discrete structures for generic metadata. For example a legacy JVM may be supplemented with a specialized class loader that translates the generic metadata structures into nominal identifiers.

Computer 700 may contain a class loader or other class tool, such as within a JVM. In operation, computer 700 may load classes such as client class 715. For example, computer 700 may load client class 715 by loading client class definition 720, such as from a class file.

9.2 Specialization Context

Computer 700 may detect that client class definition 720 implicitly or explicitly contains at least one specialization context 730 that depends upon generic class 716. Generic class 716 may have at least one type parameter, such as type parameters 751-753, that are placeholders or formal parameters to which actual types may be bound.

Type parameters 751-753 are demonstrative. They do not actually appear within generic class 716.

Specialization context 730 represents a particular usage context, such as within a lexical scope, which may require that some or all of type parameters 751-753 be erased or otherwise bound (assigned) to particular types. Such requirements are specified by at most one type assignment 741-742 per type parameter 751-753.

For example, type assignment 742 may bind particular type 713 to type parameter 753. For example, type assignment 742 may contain a reference, such as a nominal identifier or a constant pool offset, to particular type 713 and a name or ordinal position of type parameter 753.

Type assignment 741 and type parameter 751 are drawn with dashed lines to show that type assignment 741 specifies that type parameter 751 should be erased. For example, type assignment 741 may contain a reserved literal, such as "_", that indicates erasure.

Client class definition 720 may have been generated, such as by source compilation, such that specialization context 730 may use generic class 716 without specifying erasure or a particular type for some or all of type parameters 751-753. For example, generic class 716 may have lacked type parameter 752 when client class 715 was compiled.

However, generic class 716 may now have a more recent revision that includes type parameter 752. Computer 700 may erase any type parameter, such as 752, for which specialization context 730 has no corresponding type assignment. As such, type parameter 752 is drawn with dashed lines to indicate erasure.

Computer 700 may load generic class 716 by loading generic class definition 760, such as from a class file. Generic class definition 760 contains a type entry, such as 771-773, for each type parameter 751-753.

A type entry, such as 771, may specify an erasure type, such as 711, to be used when erasing a corresponding type parameter, such as 751.

9.3 Concrete Instantiation

Computer 700 may use the type information provided by type assignments 741-742 and type entries 771-773 to bind type parameters 751-753 to actual types. This binding is needed to produce a concrete instantiation of generic class 716 for use by a particular specialization context, such as 730.

For example, computer 700 may use type bindings based on type assignments 741-742 and type entries 771-773 to generate instantiation metadata 780 that specifies actual types for all of type parameters 751-753. For example, computer 700 may use instantiation metadata 780 to generate a concrete class (not shown) that instantiates generic class 716. For example, computer 700 may insert instantiation metadata 780 into the constant pool of the generated concrete class.

Instantiation metadata 780 includes a metadata entry, such as 791-793, for each type parameter 751-753. Each of entries 791-793 identifies an actual type that is bound to a corresponding type parameter 751-753.

For example, entries 791-793 may each contain a reference, such as a nominal identifier or a constant pool offset, to an actual type that binds one of type parameters 751-753. For example, computer 700 may initialize entry 793 to refer to particular type 713 because entry 793 corresponds to type parameter 753 that is bound by type assignment 742 to particular type 713.

Specialization context 730 may expressly specify erasure for some of type parameters 751-753. For example, type assignment 741 may specify that type parameter 751 should be erased.

9.4 Metadata Literals

To which actual type is type parameter 751 erased depends on corresponding type entry 771. Type entry 771 may specify that erasure type 711, such as by nominal identifier or constant pool offset, is to be used for erasing type parameter 751.

However depending on the example, type entry 771 might not specify an erasure type. In an embodiment, if type entry 771 does not specify an erasure type, then erasure type 711 is implied, such as by a type system, a language, or a JVM.

For example, a JVM may use java.lang.Object as a default erasure type for 711. In an embodiment, computer 700 may raise an error if type entry 771 does not specify an erasure type. One situation in which this might occur is if the generic class 716 has a parameterized type entry representing a reference to a second generic class, the bindings for the type variables of that second generic class being dependent on the type entry 771. Thus, if the type variable represented by that type entry 771 is bound is a concrete type, that binding is then used to determine that another type variable in the second generic class is also bound to that concrete type.

In an embodiment, if a type parameter, such as 752, lacks a corresponding type assignment within specialization context 730, then computer 700 may implicitly erase type parameter 752, drawn with dashed lines to show erasure. If type entry 772 specifies an erasure type, such as 712, then type parameter 752 will be erased using erasure type 712.

Likewise, if type entry 772 does not specify an erasure type, then computer 700 may use a default erasure type, such as Object. In an embodiment, if a type parameter, such as 752, lacks a corresponding type assignment within specialization context 730, then computer 700 may raise an error.

By applying erasure or express type assignment, as described above, computer 700 may determine an actual type for each of type parameters 751-753. Computer 700 records these actual types as entries 791-793 within instantiation metadata 780.

For example, entry 791 is configured to indicate that type parameter 751 is bound to erasure type 711. Likewise, entry 793 is configured to indicate that type parameter 753 is bound to particular type 713.

Computer 700 may use generic class 716 and instantiation metadata 780 to generate (instantiate) a concrete class (not shown) that can be directly loaded to fully satisfy specialization context 730's dependency on generic class 716. The concrete class is not generic, in the sense that entries 791-792 all identify actual types, and the definition of the concrete class pervasively uses those actual types.

For example, type entry 773 may be specified within a metadata structure such as a type variable or a parameterized type within generic class definition 760. In an embodiment, the population of instantiation metadata 780, as described above, may involve translating any structural metadata such as type variables, parameterized types, and other genericity metadata within generic class definition 760 into nominal type identifiers.

For example, a type variable within generic class definition 760 may be replaced with a mangled class name within instantiation metadata 780. Similar substitution may occur for a parameterized type or other metadata descriptor discussed above herein.

9.5 Reuse for Templated Instantiation

In an embodiment that references metadata items by constant pool offset, the nominal identifiers may occupy the same constant pool offsets as the metadata structures (e.g. descriptors) that the nominal identifiers replace. As such, entries 791-793 may individually (or together as instantiation metadata 780) be stored into the constant pool of a generated concrete class (not shown) without disturbing method and field signatures and bodies.

For example, a bytecode instruction within a method body may retain any included constant pool offsets. What changes between generic class definition 760 and the definition generated for the concrete class may be limited to replacement of what actually occupies those constant pool offsets.

As such, generic class definition 760 may be reused in conjunction with various instantiation metadata 780 to rapidly and compactly generate various concrete instantiations. This may effectively achieve templated instantiation with a possibility to reuse more or less of generic class definition 760 without further customization.

For example the bytecodes of a method body may be cloned without modification or directly shared without cloning, depending on the implementation. The constant pool offsets within the method body may remain valid, even though what they actually refer to may change (and be different between various instantiations).

10.0 Reducing a Single Use

For example, the following is a generic class in source format:

```
class Box<X> {
    X foo; // sole use of X
}
```

This class may be compiled into a class file that contains constant pool data such as:

```
#1: UTF8["Ljava/lang/Object;"]
#2: UTF8["LBox;"]
#3: TypeVar[0, #1]        // X = Object
#4: FieldDescriptor(0, #3)    // Object foo
```

If X is type parameter 753 to be specialized with type int for Box<int>, then type assignment 742 may specify particular type 713, which in turn specifies int. Then the constant pool data may reduce to:

```
#1: UTF8["Ljava/lang/Object;"]
#2: UTF8["LBox;"]
#3: UTF8["I"]             // X = int
#4: FieldDescriptor(0, #3)    // int foo
```

Whereas, if type assignment 742 specifies erasure, then the constant pool may reduce to:

```
#1: UTF8["Ljava/lang/Object;"]
#2: UTF8["LBox"]
#3: UTF8["Ljava/lang/Object;"]   // X = Object
#4: FieldDescriptor(0, #3)    // Object foo
```

An advantage of this system of replacement (reduction) is that the FieldDescriptor at offset 4 is unaltered, even for alternate reductions as shown above. This facilitates cloning or other reuse of metadata, regardless of how many type parameters are involved and how many places within bytecodes refer to those parameters. In other words, this way scales well for parameters and their uses.

11.0 Entirely Reducing a Constant Pool

The new metadata constants discussed earlier above are designed to be amenable to a reduction process, by which they are reduced to other metadata constants. In an embodiment, the other metadata constants are less expressive than the new metadata constants.

In a preferred embodiment, the other metadata constants may be directly consumed, such as during class linking by a stock (not customized) class runtime tool such as a root class loader. In such an embodiment, the new metadata constants need not be supported by the stock runtime because reduction eliminates them from the constant pool.

For example, the other metadata constants may be legacy. For example, the new metadata constants may appear in a class file having a numerically higher major/minor class file format than an older format should not contain the new metadata constants. For example, the stock runtime may be legacy that cannot process the new metadata constants.

Each of the new forms may reduce to either a UTF8 or a Class constant. This means that ultimately a constant pool should be populated by nominal representations for parameterized types like List<int>. At runtime, the JVM is free to dynamically generate nominal identifiers for particular specializations, so it may continue to use string comparison and interning for matching type and method descriptors.

12.0 Example Process for Reducing a Generic Class

Figure 8:
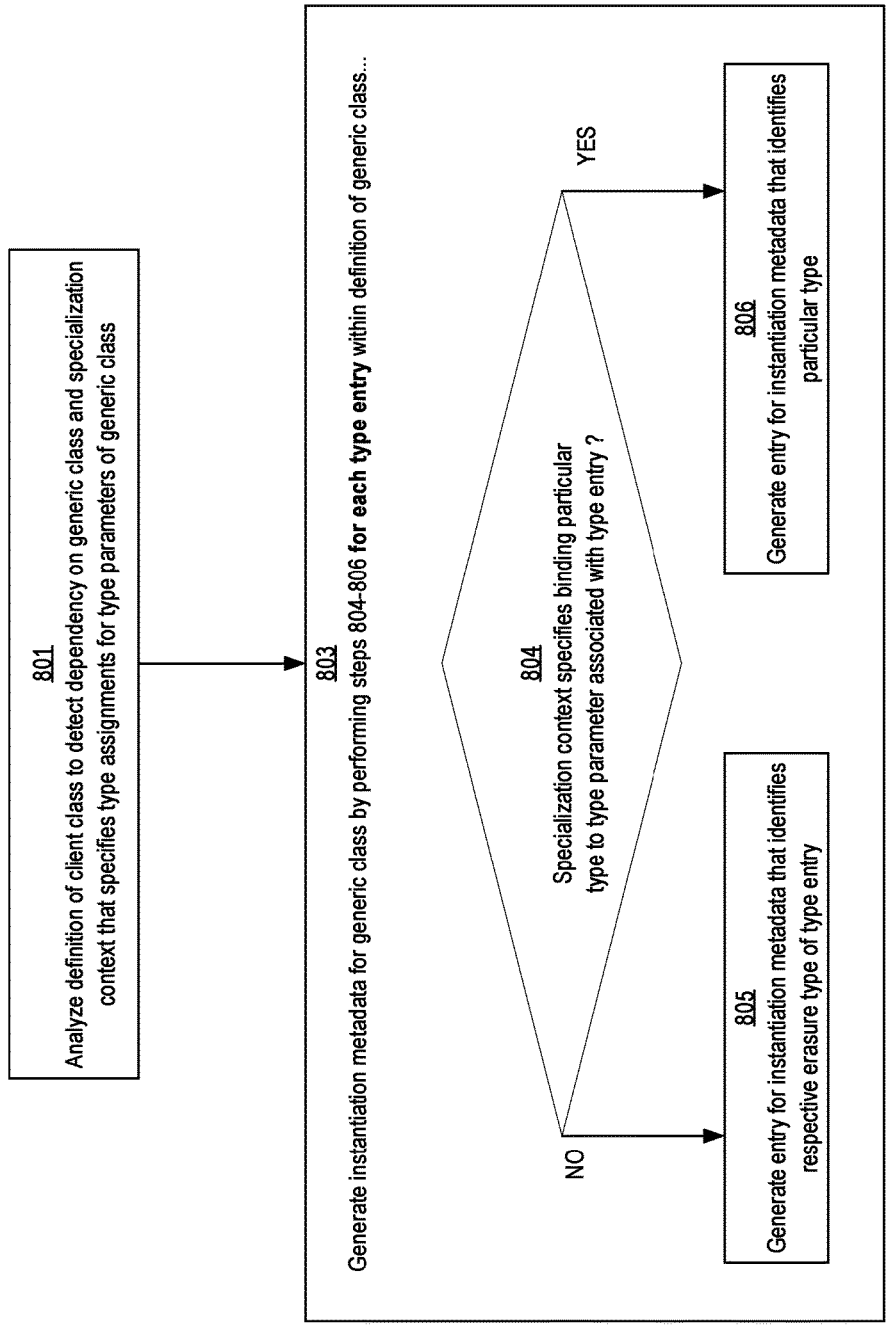
FIG. 8 is a flow diagram that depicts an example process for reducing a generic class into a concrete class according to argument type bindings, in an embodiment.

FIG. 8 is a flow diagram that depicts an example process 800 for reducing a generic class into a concrete class according to argument type bindings, in an embodiment. Process 800 is described in the context of FIG. 7.

In step 801, a definition of a client class is analyzed to detect a dependency upon a generic class and a specialization context that specifies type assignments for type parameters of the generic class. For example, computer 700 may analyze client class definition 720 during class loading. Computer 700 may process specialization context 730 to discover which of type parameters 751-753 should be erased and which of them should be bound to particular types such as 713.

In step 803, instantiation metadata is generated for the generic class by performing steps 804-806 for each type entry within the definition of generic class. For example, computer 700 may iterate over type entries 771-773 and perform steps 804-806 for each type entry. As such, steps 804-806 are repeated for each of type entries 771-773.

Each of type entries 771-773 corresponds to a respective type parameter 751-753. In step 804, whether the specialization context specifies binding a particular type to the type parameter associated with type entry. For example, computer 700 may detect that type entry 773 corresponds to type parameter 753 and type assignment 742 that specifies binding to particular type 713. Whereas, computer 700 may detect that type entry 771 corresponds to type parameter 751 and type assignment 741 that does not specify binding to a particular type. This is because type assignment 741 specifies erasure.

Steps 805-806 are mutually exclusive such that only one of those two steps is performed for each of type entry 771-773, some of which may be processed by step 805, and others of which may be processed by step 806.

If binding to a particular type is specified by the type assignment, then step 806 is performed for the type entry. Otherwise step 805 is performed to erase the type parameter.

In step 805, an entry is generated for instantiation metadata that identifies a respective erasure type of the type entry. For example within instantiation metadata 780, computer 700 creates entry 791 to erase type parameter 751 by binding type parameter 751 to an erasure type such as 711.

In some cases erasure type 711 may be expressly specified by type entry 771. In other cases, an erasure type is not specified by type entry 771, in which case a default erasure type may be used such as a root class such as Object.

In step 806, an entry is generated for instantiation metadata that identifies a particular type. For example within instantiation metadata 780, computer 700 creates entry 793 to bind type parameter 753 to particular type 713 as specified by type assignment 742.

After steps 804-805 are performed for all of type entries 771-773, then generic class 716 has been more or less reduced into a concrete class as described by instantiation metadata 780. The concrete class is more or less ready to load, link, and use as if were any other class.

13.0 Reduction by Parameterized Type

Figure 9:
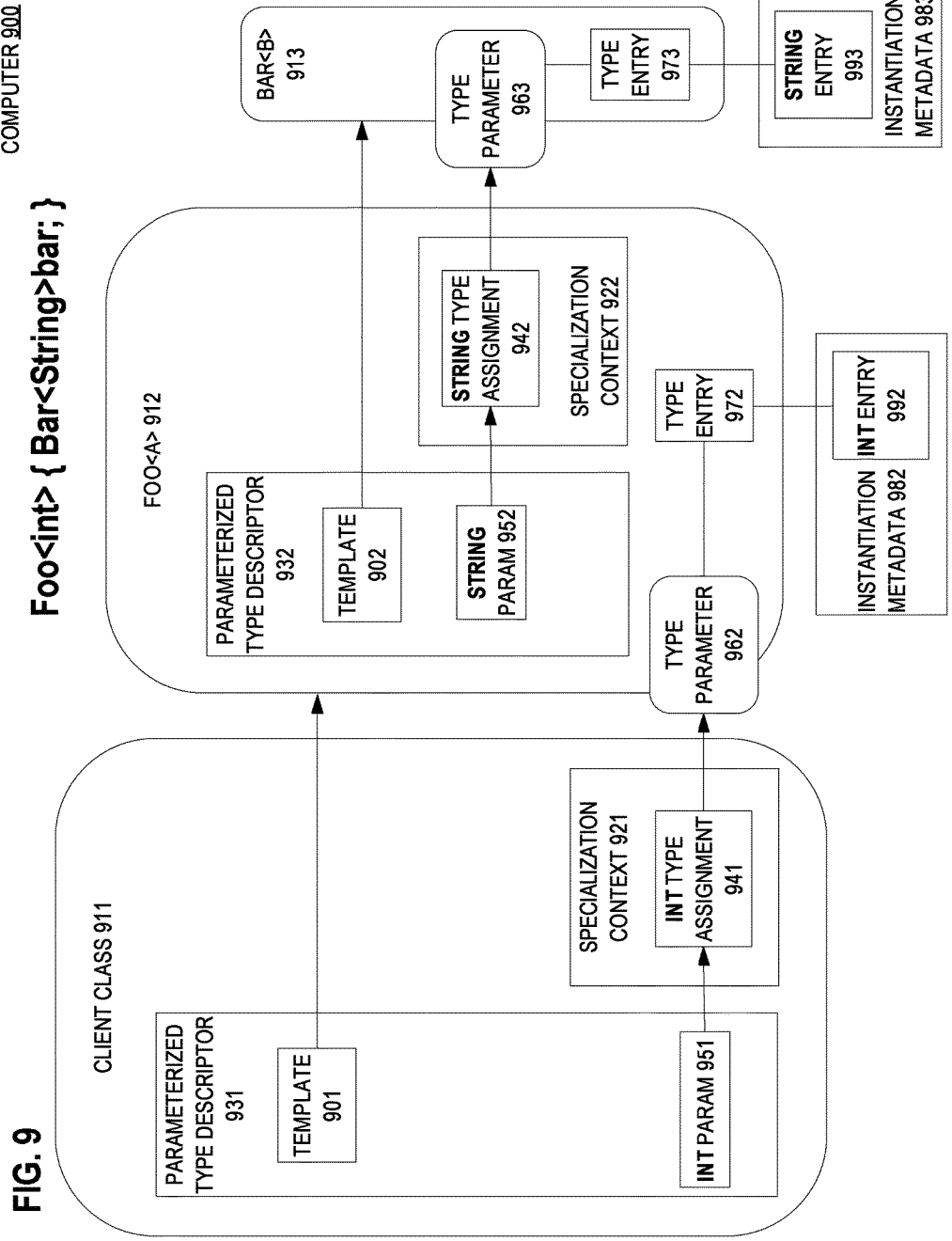
FIG. 9 is a block diagram that depicts an example computer that processes ParameterizedType descriptors to generate a concrete class, in an embodiment.

FIG. 9 is a block diagram that depicts an example computer 900, in an embodiment. Computer 900 processes ParameterizedType descriptors to generate a concrete class. FIG. 9 is distinguished from earlier figures herein because it shows a specialization context and a ParameterizedType in a same client class.

FIG. 9 shows templates of generic classes Foo<A> 912 and Bar<B> 913. Foo depends on Bar<String>, regardless of how Foo is specialized, which in this case is specialized with an int according to param 951.

In this example, computer 900 may have a class loader that loads client class 911 and detects that the definition of client class 911 contains parameterized type descriptor 931. Parameterized type descriptor 931 contains a cross reference, template 901, that refers to a generic class such as generic client Foo<A> 912, which in this example is both a generic class and a client class.

Classes 911-913 are arranged naturally as a dependency chain where client class 911 depends on generic client Foo<A> 912 that depends on generic Bar<B> 913. Processing a chain or tree of generic dependencies may involve recursive or iterative traversal.

Computer 900 may use generic client Foo<A> 912 as a template which, when provided with different argument bindings, may be reused to create various instantiations of generic client Foo<A> 912. Although classes 911-913 are shown as separate classes, they may be a same class. For example, generic Bar<B> 913 may be self referential (not as shown) and so may contain a specialization context and a parameterized type descriptor.

Generic Bar<B> 913 may also be used as an instantiation template. Whereas, client class 911 need not be generic.

For each instantiation of generic Bar<B> 913, computer 900 generates an instantiation metadata 983 based on argument bindings provided by type assignments, such as 942, and type entries such as 973. For example, type assignment 942 may provide an actual argument type or specify erasure. Likewise, type entry 973 may specify an erasure type.

14.0 Populating the Specialization Context

Reduction is performed in a specialization context, which, for each type variable, maintains whether that type variable is erased, and if not erased, its binding (which is a concrete type descriptor). If specialization is triggered by resolving a ParameterizedType constant, this specialization context may be populated from the contents of the ParameterizedType constant.

Whereas if specialization is triggered by ordinary class loading (e.g. complete erasure to Object for all parameters), the context is populated by treating all type variables as erased. For example if a client class references generic class without providing type-arguments, then the specialized class instantiated may be the 'raw' specialization, where all type-parameters are bound to the 'erased' type-argument ("_"). Depending on the implementation, raw specialization may be required to run a legacy client class on a JVM enhanced as described elsewhere above.

Populating the specialization context from a ParameterizedType constant may involve additional care. It is possible that, due to separate compilation, the client could have a stale description of the type variables of the class being specialized. The structure of the ParameterizedType and GenericClass support binary compatibility for common cases discussed elsewhere below. The chain structure of ParameterizedTypes and the frames list of the GenericClass work together. The specialization context is initially populated with an array of bindings, whose length is the total number of type variables in the GenericClass, and each binding is initialized to 'erased'. Then the chain of ParameterizedTypes is traversed, matching each ParameterizedType with the GenericClass frame for the class identified by the ParameterizedType.

14.1 Incompatible Class Change

If a generic class frame has more type variables than are present in its corresponding ParameterizedType, then these extra variables are assumed to be erased. Whereas if a ParameterizedType references more type variables than the GenericClass has, this is a linkage error such as an incompatible class change exception (ICCE). If an erased type variable is given a non-erased binding, an ICCE is raised to indicate that a type variable was added to a generic class after its client class was compiled. For example in FIG. 7, type entry 771 specifies erasure type 711 for type parameter 751, and it may be erroneous for type assignment 741 to specify an actual type for type parameter 751. Each of type entries 771-773 may specify or otherwise be associated with a type boundary (not shown), such as an upper or lower bound, and it may be erroneous for type assignment 741 to specify an actual type that does not conform to the type boundary associated with type entry 771. For example, type entry 771 may specify class Number, in which case type assignment 741 may specify class Short but not class String. Absent an error, the bindings are copied into the specialization context from the ParameterizedType to the slots corresponding to that class frame's variables.

Reducing the new constant pool forms is done bottom-up. This means that type entry parameters are resolved (to their UTF8 form) before proceeding. Any type entries parameters that resolve to a Class constant are converted (reduced) into a UTF8 type descriptor by prepending L or Q and appending ';' to the class name.

15.0 Example Process for Reduction by Parameterized Type

Figure 10:
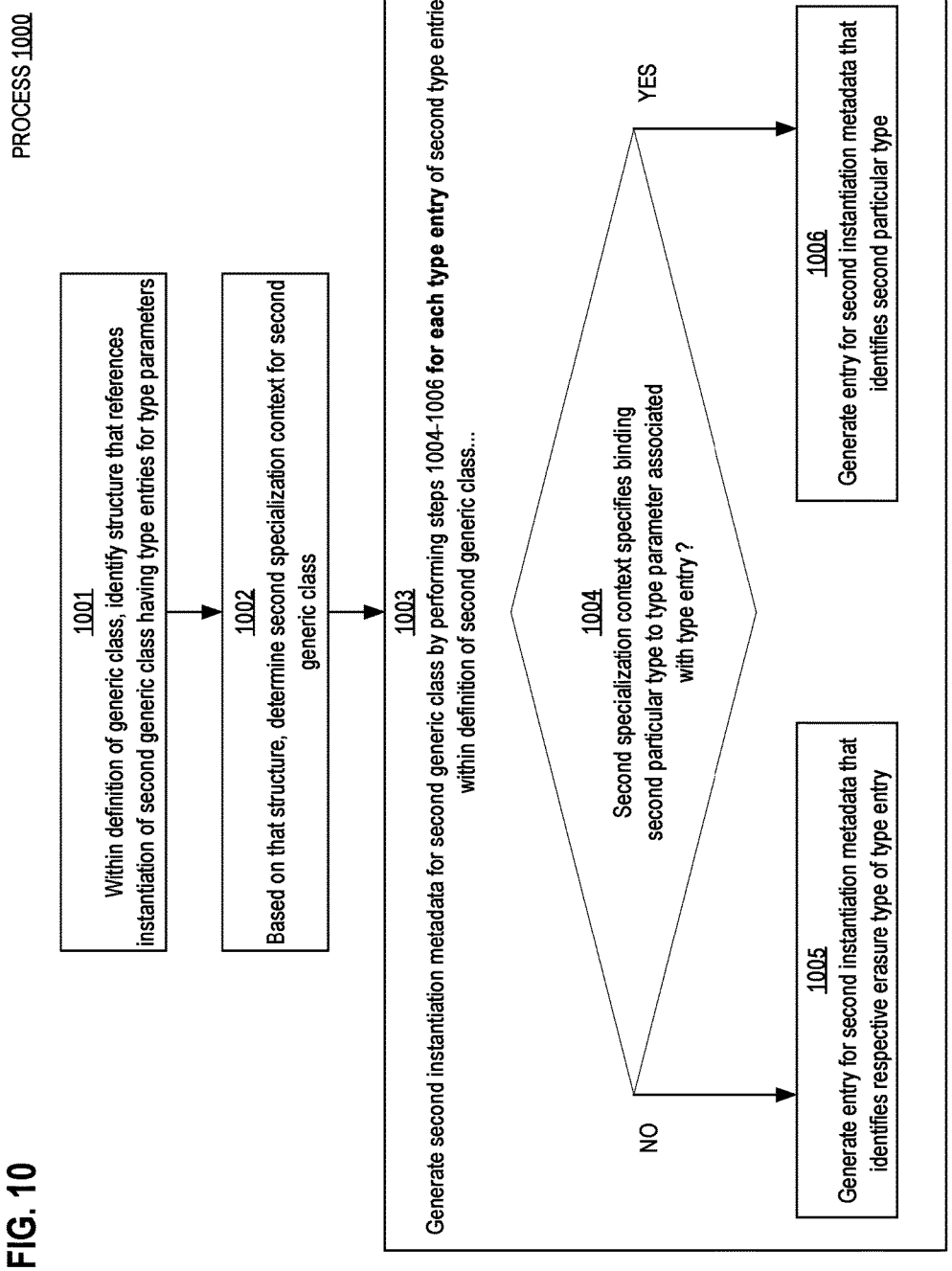
FIG. 10 is a flow diagram that depicts an example process for populating a specialization context from a ParameterizedType, in an embodiment.

FIG. 10 is a flow diagram that depicts an example process 1000 for populating a specialization context from a ParameterizedType, in an embodiment. Process 1000 is described in the context of FIG. 9.

In this example, computer 900 analyzes client class 911 during class loading. Computer 900 detects that client class 911 depends on generic client Foo<A> 912 according to template 901, which may identify generic client Foo<A> 912. This dependency causes computer 900 to load generic client Foo<A> 912, which involves performing process 1000 as follows.

In step 1001 within a definition of a first generic class, a structure is identified that references an instantiation of a second generic class having type entries for type arguments. For example, generic client Foo<A> 912 may be the first generic class, and generic Bar<B> 913 may be the second generic class.

Computer 900 may select parameterized type descriptor 932 that references generic Bar<B> 913, according to template 902, and that has type entry 973 for type argument 963.

In this example, generic client Foo<A> 912 may be a first generic class. Likewise, generic Bar<B> 913 may be a second generic class. For FIG. 10, designations of 'first' and 'second' denote aspects of generic classes 912-913 respectively.

In step 1002 and based on the structure identified in step 1001, a second specialization context is determined for the second generic class. For example, computer 900 may create specialization context 922 that may be used to bind actual types to the type parameters of generic Bar<B> 913. Computer 900 may populate specialization context 922 with bindings from parameterized type descriptor 932. For example, computer 900 may configure type assignment 942 based on param 952. As shown, param 952 specifies String, and so too will type assignment 942 be configured to specify String.

In step 1003, instantiation metadata is generated for the second generic class by performing steps 1004-1006 for each type entry within the definition of the second generic class. For example, computer 900 may create instantiation metadata 983 for generic Bar<B> 913.

Computer 900 may iterate over type entries such as 973 and perform steps 1004-1006 for each type entry of generic Bar<B> 913.

Type entry 973 corresponds to type parameter 963. In step 1004, whether the second specialization context specifies binding a second particular type to the type parameter associated with the type entry is detected. For example, computer 900 may detect that type entry 973 corresponds to type parameter 963 and type assignment 942 that may specify binding an actual type. Alternatively, computer 900 may detect that type assignment 942 instead specifies erasure.

Steps 1005-1006 are mutually exclusive such that only one of those two steps is performed for each type entry such as 973, some of which may be processed by step 1005, and others of which may be processed by step 1006.

If binding to a second particular type is specified by the type assignment, then step 1006 is performed for the type entry. Otherwise step 1005 is performed to erase the type parameter.

In step 1005, an entry is generated for second instantiation metadata that identifies a respective erasure type of the type entry. For example within instantiation metadata 983, computer 900 creates entry 993 to erase type parameter 963 by binding type parameter 963 to an erasure type (not shown).

In some cases the erasure type may be expressly specified by type entry 973. In other cases, an erasure type is not specified by type entry 973, in which case a default erasure type may be used such as a root class such as Object.

In step 1006, an entry is generated for the second instantiation metadata that identifies a second particular type. For example within second instantiation metadata 983, computer 900 creates entry 993 to bind type parameter 963 to the second particular type (shown as String) as specified by type assignment 942.

After steps 1004-1006 are performed for all of the type entries of generic Bar<B> 913, such as type entry 973, then generic Bar<B> 913 has been more or less reduced into a concrete class as described by instantiation metadata 983. The concrete class is more or less ready to load, link, and use as if were any other class.

16.0 Reducing Other New Forms

For a TypeVar[T, erased] constant, if T is erased in the current specialization context, the T is resolved to UTF8 [erased], otherwise T is resolved to the binding of T. An ArrayType[n, descriptor] constant is reduced to a UTF8 containing n leading '[' characters followed by an element type descriptor.

A MethodDescriptor[retDescr, argDescr[ ]] constant reduces to a UTF8 with a leading '(', the argument descriptors concatenated, a closing ')', and the return descriptor.

Reduction to a concrete class from a ParameterizedType [template, params[ ]] constant may involve maintaining a cache of loaded parameterizations, mapping parameterizations to a runtime-generated name for the concrete class. Reduction first looks in the cache to detect whether there is already an entry for this (template, parameters) combination. If so, then the ParameterizedType is reduced to a UTF8 that identifies the concrete class. If the cache lacks the concrete class, then reduction may dynamically allocate a new class name, put that mapping in the cache, and then reduce to a UTF8 constant encoding of that new name.

Loading a class whose name is one of these new dynamically generated names may involve retrieving the specialization metadata (template and parameters), performing specialization accordingly, and entering the new class into a system dictionary.

When reduction of any descriptor or other metadata item is complete, it is an error if the descriptor still has an erasure token.

16.1 Other Example Reductions
Given:

```
class Foo<any T> {
    void m(Foo<T> foo, Bar<T> bar) { }
}
```

A Java compiler may generate a constant pool that looks like:

```
#1: UTF8["Ljava/lang/Object;"]
#2: UTF8["Foo"]
#3: UTF8["Bar"]
#4: TypeVar[0, #1]              // T
#5: ParamType[0, 'L', #2, #4]   // Foo<T>
#6: ParamType[0, 'L', #3, #4]   // Bar<T>
#7: UTF8["V"]
#8: MethodDescriptor(2, #7, #5, #6)   // (Foo<T>, Bar<T>)V
```

The compiler generates a CONSTANT_Methodref_info for m that refers (indirectly) to #8. If a client specializes Foo<erased>, then computer 900 reduces the constant pool to:

```
#1: UTF8["Ljava/lang/Object;"]
#2: UTF8["Foo"]
#3: UTF8["Bar"]
#4: UTF8["Ljava/lang/Object;"]
#5: Class[#2]
#6: Class[#3]
#7: UTF8["V"]
#8: UTF8["(LFoo;LBar;)V"]
```

On the other hand, if the client specializes Foo<int>, then computer 900 reduces the constant pool to:

```
#1: UTF8["Ljava/lang/Object;"]
#2: UTF8["Foo"]
#3: UTF8["Bar"]
#4: UTF8["I"]
#5: Class[#9]
#6: Class[#10]
#7: UTF8["V"]
#8: UTF8["(LFoo${I};LBar${I};)V"]
#9: UTF8["Foo${I}"]   // or other nominal encoding
#10: UTF8["Bar${I}"]  // or other nominal encoding
```

17.0 Type Propagation

Figure 11:
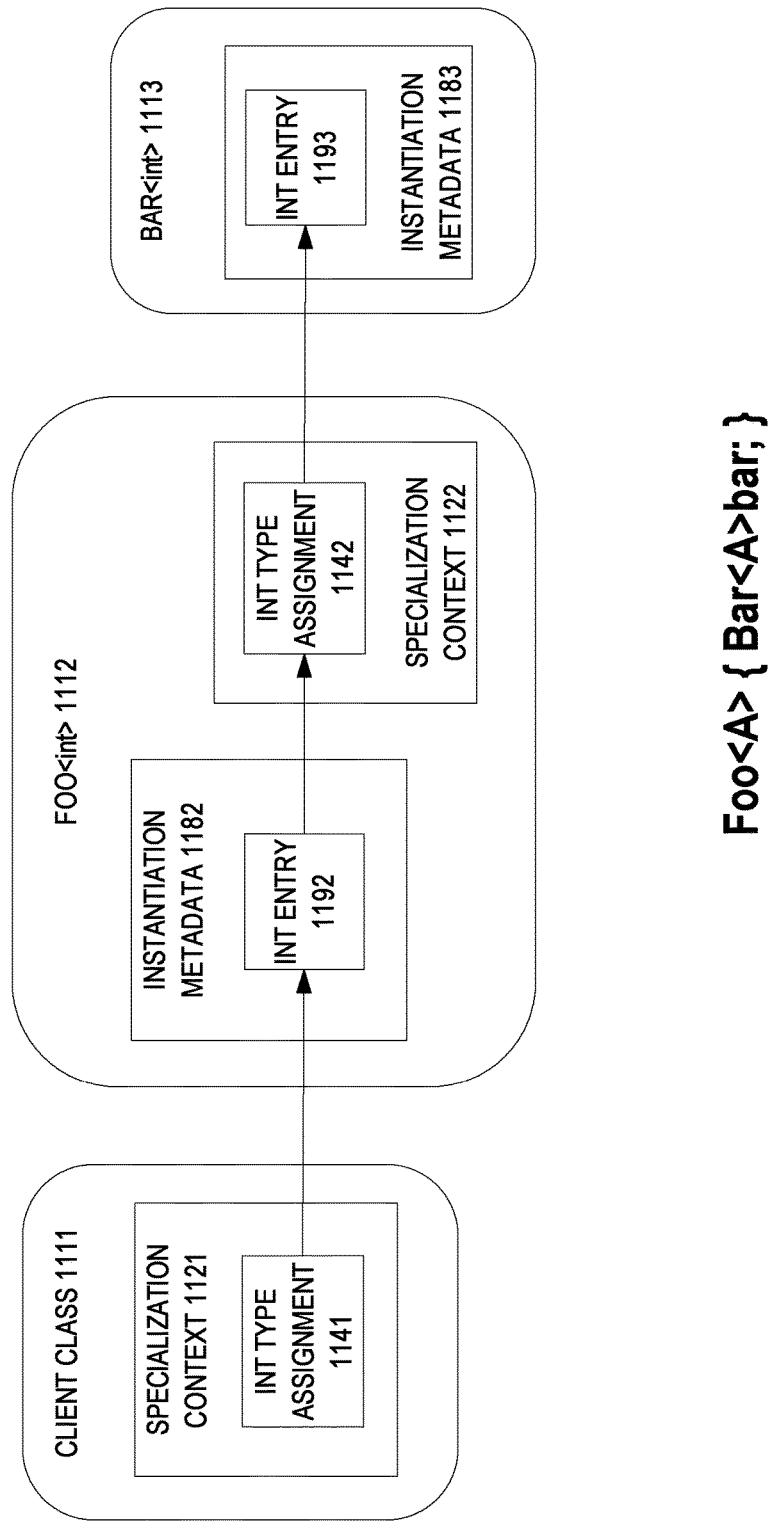
FIG. 11 is a block diagram that depicts an example computer that processes a dependency chain of ParameterizedType descriptors to inject an argument type into multiple generic classes, in an embodiment.
Figure 12:
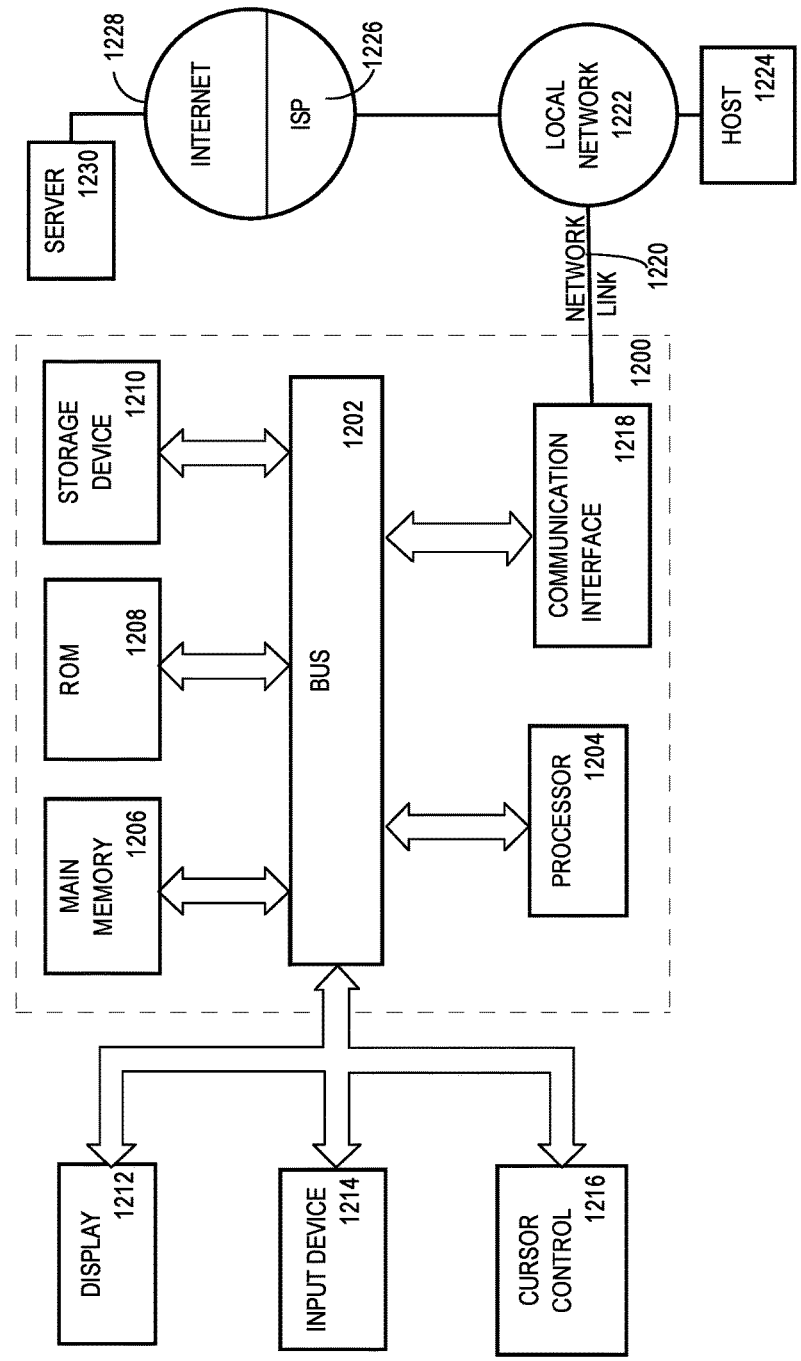
FIG. 12 is a block diagram that illustrates a computer system upon which an embodiment of the invention may be implemented.

FIG. 11 is a block diagram that depicts an example computer 1100, in an embodiment. Computer 1100 processes a dependency chain of ParameterizedType descriptors to inject an argument type into multiple generic classes, such as 1112-1113.

FIG. 11 is distinguished from FIG. 9 because it shows specialization context 1122 configured according to instantiation metadata 1182. That is, the int type is injected from client class 1111 thru Foo<int> 1112 and into Bar<int> 1113. Thus, changing the parameterization of Foo<A> to int may also change the parameterization of Bar<B> to int.

18.0 Compatibility

Classes may evolve. Some evolutions are backward compatible, and some are not. Here are some compatibility consequences of the techniques described above.

Method parameters can be renamed, but not reorder or remove them. Here are two compatibility aspects of method argument lists:

Alpha-renaming a type variable (to a non-shadowed name) should be binary and source compatible.

Reordering or removing type variables might not be compatible.

More general compatibility aspects may include:

Anyfying an existing erased type variable should be binary and source compatible.

Adding a new type variable at the end of the argument list should be binary compatible (though not necessarily source compatible). Adding a new type variable other than at the end might not be compatible.

Generifying an enclosing scope (evolving Outer.Inner<U> toOuter<T>.Inner<U>) should be binary compatible.

Changing type variable bounds might not be binary compatible.

19.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer implemented method comprising:
    receiving, into memory, a definition of a generic class having one or more type parameters, wherein the definition of the generic class contains, for each type parameter of the one or more type parameters:
        a type variable declaration, and
        one or more usage entries, wherein each usage entry of the one or more usage entries:
            a) represents a different usage of the type parameter, and
            b) may specify an erasure type for the usage entry;
    receiving an instruction from a dependent class that references the generic class, wherein data referenced by the instruction specifies, for each type parameter of the one or more type parameters, whether the type parameter is to be assigned to a particular type or erased;

generating an instantiation of the generic class by at least, for each particular type parameter of the one or more type parameters:

determining that the data referenced by the instruction specifies that the particular type parameter is to be erased, and in response, for each usage entry of the one or more usage entries for the particular type parameter, determining the usage entry specifies an erasure type for the usage entry and, in response, generating a type entry that corresponds to the erasure type of the usage entry, or determining the usage entry does not specify an erasure type for the usage entry and, in response, generating a type entry that corresponds to a default erasure type; or determining that the data referenced by the instruction specifies that the particular type parameter is to be assigned to the particular type, and in response, for each usage entry of the one or more usage entries for the particular type parameter, generating a type entry that corresponds to the particular type of the usage entry.

2. The method of claim 1 wherein generating an instantiation of the generic class comprises copying only a portion of the definition of the generic class.

3. The method of claim 1 further comprising emitting bytecode that encodes the instantiation of the generic class.

4. The method of claim 1 wherein receiving the instruction from the dependent class comprises receiving, into memory, a definition of the dependent class.

5. The method of claim 1 wherein the definition of the generic class contains a generic class attribute that contains the one or more usage entries and the type variable declaration for each type parameter of the one or more type parameters.

6. The method of claim 1 wherein:
the generic class lexically encloses a second generic class,
the definition of the generic class contains a second type variable declaration that corresponds to a type argument of the second generic class.

7. The method of claim 1 further comprising:
receiving a second instruction from the dependent class, wherein data referenced by the second instruction specifies, for each type parameter of the one or more type parameters, whether the type parameter is to be erased or assigned to a particular type that is different from the particular type specified by the instruction for the type parameter;

generating a second instantiation of the generic class by at least, for each particular type parameter of the one or more type parameters:

determining that the data referenced by the second instruction specifies that the particular type parameter is to be erased, and in response, for each usage entry of the one or more usage entries for the particular type parameter, generating a type entry that corresponds to the erasure type of the usage entry, or determining that the data referenced by the second instruction specifies that the particular type parameter is to be assigned to the particular type, and in response, for each usage entry of the one or more usage entries for the particular type parameter, generating a type entry that corresponds to the particular type.

8. The method of claim 1 wherein the particular type is a parameterization of a second generic class.

9. The method of claim 1 wherein receiving the instruction from the dependent class occurs during at least one class loading phase of: class linking, class finding, or class resolution.

10. The method of claim 1 wherein receiving a definition of a generic class comprises receiving a class file that contains bytecode.

11. The method of claim 1 wherein:
a particular usage entry of the one or more usage entries for a particular type parameter of the one or more type parameters identifies a parameterized type descriptor that describes an instantiation of a second generic class;
the parameterized type descriptor comprises at least one parameter field that corresponds to a respective argument of the second generic class;
each parameter field of the at least one parameter field provides a respective particular type to use when instantiating the second generic class.

12. The method of claim 1 wherein generating a usage entry comprises detecting that the generic class has not already been instantiated with the particular type.

13. The method of claim 1 wherein the instruction from the dependent class specifies at least one of:
accessing a field of the generic class,
invoking a method of the generic class, or
identifying the generic class as an argument or a superclass of a second generic class.

14. The method of claim 1 wherein each usage entry of the one or more usage entries contains a reference to the type variable declaration for the type parameter.

15. A computer implemented method of claim 1 comprising:
receiving, into memory, a definition of a generic class having one or more type parameters,
wherein, for each type parameter of the one or more type parameters, the definition of the generic class contains:
a type variable declaration, and
one or more usage entries, wherein each usage entry of the one or more usage entries represents a different usage of the type parameter and may specify an erasure type for the usage entry,
wherein the definition of the generic class contains a first usage entry and a second usage entry for a particular type parameter of the one or more type parameters;
receiving a plurality of instructions from a dependent class that references the generic class, wherein data referenced by the plurality of instructions specifies, for each type parameter of the one or more type parameters, whether the type parameter is to be assigned to a particular type or erased,
wherein the plurality of instructions contains: a) a first instruction that specifies that the particular type parameter is to be assigned to the particular type, and b) a second instruction that specifies that the particular type parameter is to be erased;
generating an instantiation of the generic class by at least, generating a plurality of type entries for the one or more type parameters, wherein the plurality of type entries contains, for the particular type parameter, a first type entry that corresponds to the particular type of the first usage entry, and;

if the second usage entry specifies an erasure type for the usage entry, generating a second type entry that corresponds to the erasure type of the second usage entry, otherwise generating a second type entry that corresponds to a default erasure type.

16. A device comprising:
a memory configured to store a definition of a generic class having one or more type parameters, wherein the definition of the generic class contains a generic class attribute that contains, for each type parameter of the one or more type parameters:
a type variable declaration, and
one or more usage entries, wherein each usage entry of the one or more usage entries:
a) represents a different usage of the type parameter, and
b) may specify an erasure type for the usage entry;
a processor connected to the memory and configured to:
receive an instruction from a dependent class that references the generic class, wherein data referenced by the instruction specifies, based on how a particular portion of the dependent class uses a particular type parameter represented by a particular type variable declaration of the generic class attribute, whether the particular type parameter is to be assigned to a particular type or erased;
in response to determining that the data referenced by the instruction specifies that the particular type parameter is to be erased, for each usage entry of the one or more usage entries for the particular type parameter,
determining the usage entry specifies an erasure type for the usage entry and, in response; generating a type entry that corresponds to the erasure type of the usage entry, or
determining the usage entry does not specify an erasure type for the usage entry and, in response, generating a type entry that corresponds to a default erasure type;
in response to determining that the data referenced by the instruction specifies that the particular type parameter should use the particular type, for each usage entry of the one or more usage entries for the particular type parameter, generating a type entry that corresponds to the particular type of the usage entry.

17. One or more non-transitory computer-readable media storing instructions that, when executed by one or more processors, cause:
receiving, into memory, a definition of a generic class having one or more type parameters, wherein the definition of the generic class contains, for each type parameter of the one or more type parameters:
a type variable declaration, and
one or more usage entries, wherein each usage entry of the one or more usage entries:
a) represents a different usage, of the type parameter, and
b) may specify an erasure type for the usage entry;
receiving an instruction from a dependent class that references the generic class, wherein data referenced by the instruction specifies, based on how a particular portion of the dependent class uses a particular type parameter represented by a particular type variable declaration of the definition of the generic class, whether the particular type parameter is to be assigned to a particular type or erased;

in response to receiving the instruction from the dependent class, generating a type entry that indicates how to obtain an actual type for use, within the particular portion of the dependent class, as the particular type parameter;
in response to determining that the data referenced by the instruction specifies that the particular type parameter is to be erased, for each usage entry of the one or more usage entries for the particular type parameter,
determining the usage entry specifies an erasure type for the usage entry and, in response; generating a type entry that corresponds to the erasure type of the usage entry, or
determining the usage entry does not specify an erasure type for the usage entry and, in response, generating a type entry that corresponds to a default erasure type;
in response to determining that the data referenced by the instruction specifies that the particular type parameter should use the particular type, for each usage entry of the one or more usage entries for the particular type parameter, generating a type entry that corresponds to the particular type of the usage entry.

18. The one or more non-transitory computer-readable media of claim 17 wherein generating an instantiation of the generic class comprises, without copying all of the definition of the generic class, copying at least one of: at least one usage entry of the one or more usage entries or at least one type variable declaration.

19. The one or more non-transitory computer-readable media of claim 17 wherein the instructions, when executed by the one or more processors, further cause:
receiving a second instruction from the dependent class, wherein data referenced by the second instruction specifies, for each type parameter of the one or more type parameters, whether the type parameter is to be erased or assigned to a particular type that is different from the particular type specified by the instruction for the type parameter;
generating a second instantiation of the generic class by at least, for each particular type parameter of the one or more type parameters:
determining that the data referenced by the second instruction specifies that the particular type parameter is to be erased, and in response, for each usage entry of the one or more usage entries for the particular type parameter, generating a type entry that corresponds to the erasure type of the usage entry, or
determining that the data referenced by the second instruction specifies that the particular type parameter is to be assigned to the particular type, and in response, for each usage entry of the one or more usage entries for the particular type parameter, generating a type entry that corresponds to the particular type.

20. The one or more non-transitory computer-readable media of claim 17 wherein:
a particular usage entry of the one or more usage entries for a particular type parameter of the one or more type parameters identifies a parameterized type descriptor that describes an instantiation of a second generic class;
the parameterized type descriptor comprises at least one parameter field that corresponds to a respective argument of the second generic class;
each parameter field of the at least one parameter field provides a respective particular type to use when instantiating the second generic class.

21. The one or more non-transitory computer-readable media of claim 17 wherein the instruction from the dependent class specifies at least one of:
   accessing a field of the generic class,
   invoking a method of the generic class, or
   identifying the generic class as an argument or a superclass of a second generic class.

\* \* \* \* \*

UNITED STATES PATENT AND TRADEMARK OFFICE
CERTIFICATE OF CORRECTION

PATENT NO. : 10,275,226 B2  
APPLICATION NO. : 15/332277  
DATED : April 30, 2019  
INVENTOR(S) : Maurizio Cimadamore et al.

It is certified that error appears in the above-identified patent and that said Letters Patent is hereby corrected as shown below:

In the Specification

In Column 24, Line 1, Delete "ParmeterizedType" and insert -- ParameterizedType --, therefor.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*